(12) United States Patent
Guez et al.

(10) Patent No.: US 7,860,596 B2
(45) Date of Patent: Dec. 28, 2010

(54) INTELLIGENT MODELING AND CONTROL OF AUTOMATION

(75) Inventors: Allon Guez, Philadelphia, PA (US); Timothy P. Kurzweg, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 12/398,048

(22) Filed: Mar. 4, 2009

(65) Prior Publication Data

US 2009/0276073 A1 Nov. 5, 2009

Related U.S. Application Data

(63) Continuation of application No. 10/576,159, filed as application No. PCT/US2004/033855 on Oct. 15, 2004, now Pat. No. 7,526,356.

(60) Provisional application No. 60/512,567, filed on Oct. 17, 2003.

(51) Int. Cl.
 *G06F 19/00* (2006.01)
 *G02B 6/26* (2006.01)
 *G02B 6/36* (2006.01)
 *H01L 27/15* (2006.01)

(52) U.S. Cl. ........................... 700/104; 385/24; 385/52; 385/88; 257/82; 257/184; 257/200

(58) Field of Classification Search ................. 700/104; 385/24, 52, 88; 257/82, 184, 200
See application file for complete search history.

(56) References Cited

U.S. PATENT DOCUMENTS

| 5,428,704 | A | 6/1995 | Lebby |
| 5,454,004 | A | 9/1995 | Leger |
| 5,471,381 | A * | 11/1995 | Khan ........................ 700/48 |
| 5,745,624 | A | 4/1998 | Chan |
| 5,761,350 | A | 6/1998 | Koh |
| 5,887,089 | A | 3/1999 | Deacon |
| 5,977,567 | A | 11/1999 | Verdiell |
| 5,982,954 | A | 11/1999 | Delen et al. |
| 6,003,341 | A | 12/1999 | Bloom |

(Continued)

OTHER PUBLICATIONS

Ault, Stanley K. et al., "A Computer Vision Based Machine for Automated Packaging of Photonics Components", LEOS Annual Meeting, 1996, pp. 238-239, vol. 2.

(Continued)

*Primary Examiner*—Albert DeCady
*Assistant Examiner*—Sunray R Chang
(74) *Attorney, Agent, or Firm*—Knoble, Yoshida & Dunleavy, LLC

(57) ABSTRACT

A system and method for advanced device specific knowledge based modeling as well as intelligent control to yield high performance, low cost automation for optoelectronic design, packaging and assembly. The control loop design is based on knowledge based model predictive control. A knowledge model, specific to the assembled package's characteristics, is used to set the initial "feed-forward" conditions of an automation system. In addition to this feed-forward model for setting the initial set point, the controller is designed with feedback components, along with the inclusion of a built in sensor. This system and method increases the efficiency of the automation process and the number of assembly steps can be greatly reduced. A method for the design, assembly and packaging of optoelectronic devices is also described.

14 Claims, 23 Drawing Sheets

U.S. PATENT DOCUMENTS

| | | | |
|---|---|---|---|
| 6,014,396 | A | 1/2000 | Osinski |
| 6,016,211 | A | 1/2000 | Szymanski |
| 6,164,837 | A | 12/2000 | Haake |
| 6,237,370 | B1 | 5/2001 | Bloom |
| 6,243,508 | B1 | 6/2001 | Jewel |
| 6,325,551 | B1 | 12/2001 | Williamson |
| 6,334,505 | B1 | 1/2002 | Li |
| 6,359,681 | B1 | 3/2002 | Housand |
| 6,363,183 | B1 | 3/2002 | Koh |
| 6,376,268 | B1 | 4/2002 | Verdiell |
| 6,430,337 | B1 | 8/2002 | Bergmann |
| 6,542,723 | B1 | 4/2003 | Tong |
| 6,559,464 | B1 | 5/2003 | Flanders |
| 6,621,605 | B1 | 9/2003 | Grossetie et al. |
| 6,736,553 | B1 | 5/2004 | Stiehl |
| 6,910,812 | B2* | 6/2005 | Pommer et al. ............... 385/92 |
| 7,068,891 | B1* | 6/2006 | Cook et al. ................... 385/52 |
| 2002/0062170 | A1 | 5/2002 | Skunes |
| 2003/0201462 | A1* | 10/2003 | Pommer et al. ............. 257/200 |

OTHER PUBLICATIONS

Banerjee, S. Riki and Drayton, Rhonda Franklin, "Micromachined Low Dispersion Interconnects for Optoelectronic Array Packaging", IEEE MTT-S Digest, 2002, pp. 1565-1568.

Guez, Allon et al., "Multiple Objective Optimization Approach to Adaptive and Learning Control", International Journal of Control, 1992, pp. 469-482, vol. 56, No. 2, Abstract Only.

Guez, Allon and Selinsky, Joh, "Neurocontroller Design Via Supervised and Unsupervised Learning", Journal of Intelligent and Robotic Systems, 1989, pp. 307-335, vol. 2.

Jang, Soon, "Automation Manufacturing Systems Technologoy for Opto-Electronic Device Packaging", 2000 Electronic Components and Technology Conference, 50th Proceedings, 2000, pp. 10-14.

Kurzweg, Timothy P., "Optical Propagation Methods for System-Level Modeling of Optical MEM Systems", Ph.D. Thesis, University of Pittsburgh, department of Electrical Engineering, 2002.

Kurzweg, Timothy P., et al., "A Fast Optical Propagation Technique for Modeling Micro-Optical Systems", Proceedings of the 2—2 Design Automation Conference, New Orleans, LA, 2002.

Kurzweg, Timothy P., et al., "Modeling Optical MEM Systems", Journal of Modeling and Simulation of Microsystems, 2001, pp. 21-34, vol. 2, No. 1.

Kurzweg, Timoth P. and Morris III, Arthur S., "Macr-Modeling of Systems Including Free-Space Optical MEMS", Third International Conference on Modeling and Simulation of Microsystems, Semiconductors, Sensors and Actuators (MSM00), San Diego, CA, 2000.

Levitan, Steven P., et al., "Chatoyant: A Computer-Aided-Design Tool for Free-Space Optoelectronic Systems", Applied Optics, 1998, pp. 6078-6092, vol. 37, No. 26.

Levitan, Steven P., et al., "System Simulation of Mixed-Signal Multi-Domain Microsystems with Piecewise Linear Models", IEEE Transactions on Computer-Aided-Design of Integrated Circuits and Systems, 2003, pp. 139-154, vol. 22, No. 2.

Martinez, Jose A., et al., "Mixed-Technology System-Level Simulation", Analog Integrated Curcuits and Signal Processing, 2001, pp. 127-149 vol. 29.

Velsher, Ben, "Application-Specific Optoelectronic Packaging", 2002 Electronic Components and Technology Conference, 52nd Proceedings, 2002, pp. 794-800.

Wu, Ming C., "Micromachining for Optical and Optoelectronic Systems", Proceedings of the IEEE, 1997, pp. 1833-1856, vol. 85, No. 11.

Yamauchi, Kenji, et al., "Automated Mass Production Line for Optical Module Using Passive Alignment Technique", 2000 Electronic Components and Technology Conference, 50th Proceedings, 2000, pp. 15-20.

Kurzweg, Timothy P., et al., "Model Based Opto-Electonic Packaging Automation", IEEE Journal of Selected Topics in Quantum Electronics, 2004, pp. 445-454, vol. 10, No. 3.

* cited by examiner

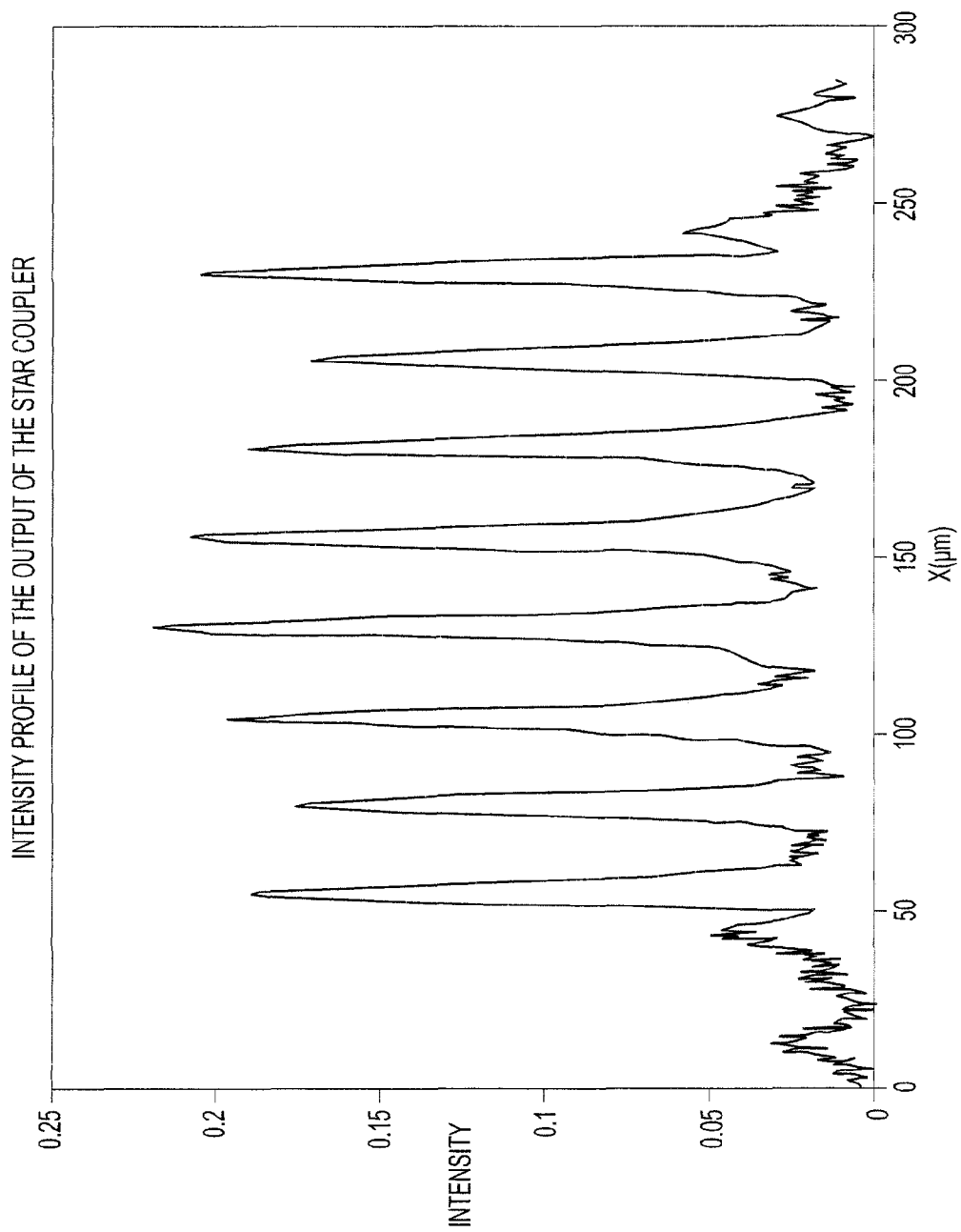

INTELLIGENT MODELING AND CONTROL OF AUTOMATION

CROSS REFERENCE TO RELATED APPLICATIONS

This application is a continuation of U.S. patent application Ser. No. 10/576,159, filed on Jun. 26, 2006, now U.S. Pat. No. 7,526,356 currently pending, which, in turn, is a 371 continuation of International patent application number PCT/US2004/033855, filed on Oct. 15, 2004, now expired, which, in turn, is a nonprovisional of U.S. provisional patent application No. 60/512,567, filed on Oct. 17, 2003.

BACKGROUND OF INVENTION

1. Field of Invention

This invention relates to the automation of the packaging and assembly of optoelectronics. Specifically, the present invention relates to the provision of intelligent control and system level modeling in order to obtain high performance, low cost automation of assembly and packaging.

2. Description of the Related Technology

The current trend in optical microsystem design is to exploit advanced devices and new system architectures to achieve greater system performance, such as higher data rates or brighter displays. Advancements in the optics field may have driven up the demand for complicated devices, however the packaging and assembly of these complicated devices has not increased in sophistication. As a consequence the current methods of packaging and assembling optoelectronics do not produce the most favorable results.

Examples of new devices increasing optical capacity are numerous. Research is being performed in micro-electrical-mechanical systems (MEMS), in which micro-machined mirrors steer an optical signal through a switching network. Next generation systems, supporting terabit/sec communication are being designed with thin film electro-optic modulators, low-loss hetero-structure waveguides and photonic integrated circuits, and high efficiency, edge-emitting, multi-wavelength quantum dot laser arrays. Other nanostructures are being used in WDM systems for optical signal processing, polarization control of VCSEL lasers, all-optical buffers, and micro-resonators. Beyond the telecommunications field, there have been advances in devices for displays and sensors. These include, holographic polymer dispersed liquid crystals, photonic crystals, and nano-tubes.

Although there has been much advancement in the field of complex optical devices, there has been little to no advancement in the assembly or packaging of these products. However, to push towards the theoretical limits of optical Microsystems, accurate alignment and packaging of multi-domain systems is required. Packaging is a challenging problem, as systems are typically manually aligned. This technique is labor intensive, slow, and can lead to a poor performance of the optical system. Even with recent progress in the development of devices and Microsystems, the packaging and assembly of these systems remains as a possible critical limiting factor to their commercial success.

Automation is the key to high volume, low cost, and high consistency manufacturing, while ensuring performance, reliability and quality. There is a growing interest in the development of automation techniques for photonic alignment and packaging, as the optical microsystem industry desires the benefits of automation experienced by, for example, the semiconductor industry. However, the photonic community cannot simply use the same automation processes as the semiconductor industry. The equipment is not optimized for optoelectronic packaging automation since the optical and geometric axes of these optical Microsystems are often not aligned with one another. This points out the fundamental difference between electrical, or semiconductor automation, and optical automation. In the electrical domain, a good attachment occurs between two components when they physically touch and solder flows between them. However, in the optical domain, not only is a good connection needed, an exact orientation alignment is required. As a result, packaging costs currently account for 60-80% of the entire photonic component cost.

The current automation technique used has many limitations. First, if the optical wavefront is not a symmetric uni-mode function, the control algorithm can get "caught" at local power maximums instead of the global maximum of the entire wavefront. This error can yield a dramatic loss in power efficiency, SNR, and BER for the assembled product. Therefore, as the complexity of the optical wavefront increases, possibly with the addition of complex devices such as MEMS and diffractive optical elements (DOE), the current technique of alignment might not yield maximum system performance.

Secondly, since multi-space searches are employed with a gradient ascent algorithm, the convergence time of the alignment equipment will depend on factors such as the control resolution and processing power. A package with multiple degrees of freedom may result in a delayed assembly line, since the gradient ascent algorithm for multiple axes is very slow and sometimes non-converging. This increases the cost of the automation process. Lastly, current servos and control (PID) loops deployed for semiconductor equipment do not employ process knowledge base data in the loop.

Most of the existing photonic automation systems couple laser diodes to fiber, fiber to fiber, or waveguide (on an integrated circuit) to a fiber. The state-of-the-art technology is based on industrial and semiconductor automation, robotics, motion control, sensor technology, and existing capital equipment. For uni-mode optical signals, such as Gaussian shaped beams emitted from laser sources, waveguides, and fibers, photonic automation is advancing. However, to date, no significant defined standard has been developed to implement automation for general optical systems. Therefore, the majority of production lines for photonic systems are still only poorly automated.

Currently, photonic alignment research is performed in academic institutions by examining how packaging and alignment can be designed in the system substrate through micromachining. In addition, some leading automation and optical component companies have realized the importance of automation for photonic systems. The control loop implemented by these industries is described in and seen in FIG. 1.

The technique in FIG. 1 is based on a combination of visual inspection and maximizing power alignments. This work has shown promise for the support of optical automation for simple uni-modal power distributions, as the Proportional Integral Derivative (PID) loops converge to a single mode. The loop 100 in FIG. 1 is called the servo-feedback loop. The servo-feedback loop performs a gradient ascent 108 on the measured optical power by comparing consecutive power readings $P_k$ and $P_{k-1}$ 112 at configurations $x_k$ and $x_{k-1}$. A gradient, $(P_k-P_{k-1})/(x_k-x_{k-1})$, is formed which guides the axis motion to the next configuration, $x_{k+1}$:

$$x_{k+1}=x_k+\eta((P_k-P_{k-1})/(x_k-x_{k-1}))$$

where, $\eta$ is the gradient accent coefficient, which is the resolution of the step.

Currently, the control loop is initiated to a set point ($x_0$) by a vision system 102. Key shapes of the fiber or waveguide are searched for in the field of vision of a CCD camera focused at the alignment and attachment point. From these searches, the automation software "visualizes" the desired link, and initializes the control motors with a determined set point via the initialization loop 104. After determining the vision set point, the alignment is fine-tuned by the local gradient ascent search to a local power maximum, as described in FIG. 1. Each axis of motion is independently controlled, and typically, the number of controlled axes is quite small. To obtain the required power measurement, a laser is used to excite the system and a power meter is attached to the output fiber, this can be seen in step 106. In the event that the system is not being aligned correctly the system stops and the alignment is fixed in step 110. In efforts to decrease the amount of time to determine the peak power mode, efficient positioning algorithms have been implemented, based on the assumption that the power distribution will always be a uni-mode (Gaussian) shape. The algorithm picks three initial points and measures the power at each. From these results, the algorithm determines three new points based on a Gaussian distribution, and continues this process until the power peak is found.

Due to the limitations of the current automation techniques discussed above, there is a need for a knowledge based modeling process for the automation of photonic systems in order to reach the potential of the high-capacity optical systems in which packaging and automation are keys to performance and cost.

SUMMARY OF THE INVENTION

Accordingly, it is an object of certain embodiments of the invention to provide advanced automation as well as intelligent control to yield high performance, low cost automation for packaging and assembly systems.

A knowledge based model is used to predict the best design, assembly and/or packaging for a given application, along with a completely automated active optical feedback loop for ensuring an accurate and efficient automation of the design, packaging and/or assembly of devices.

In a first aspect of the invention, a system for the design, packaging and automated assembly of optoelectronic devices is disclosed. The system includes an automated device configured for the manipulation and handling of optoelectronic device components and a knowledge based model derived from a set of parameters for optoelectronic devices. These parameters can comprise one or more of the following: alignment factors, type of assembly task, material type, geometry, dimensions, as well as optical characteristics and features of the optoelectronic device and/or its components. There is also a database in which the knowledge based model is stored for use by the system.

The system also includes a controller that controls the automated device. This controller is enabled to receive information from the database. The controller is made up of an initial set point device, and a servo-feedback loop. The initial set point device uses the knowledge based model for setting an initial set point. The servo-feedback loop begins at the initial set point and controls the movement of the optoelectronic components. A measuring device is used for taking measurements in the system. These measurements are used by the servo-feedback loop to adjust the movement of components in the system.

In a second aspect of the invention, a method for the design, packaging and automated assembly of optoelectronic devices is disclosed. The method includes the steps of providing an automated device configured for the manipulation of optoelectronic device components, determining an initial set point using a knowledge-based model of the optoelectronic device, providing the initial set point to a servo-feedback loop, positioning the device to the initial set point, obtaining a measurement of the system with a measuring device and then using the measurement to adjust the position of one or more of the optoelectronic device components.

These and other aspects of the present invention will be apparent from the detailed descriptions of the invention, which follow.

BRIEF DESCRIPTION OF THE DRAWINGS

FIG. 10(*b*) shows an intensity contour of a wavefront propagated 22.5 μm past a 30 μm aperture.

FIGS. 11(*b*)-11(*c*) show optical intensity contours three dimensions and two dimensions for the star coupler of FIG. 11(*a*).

FIG. 17(*b*) shows an intensity diagram showing the gradient ascent algorithms for both the instant invention's model and a currently used model.

DETAILED DESCRIPTION

1. System Overview

The system and method of the present invention can be used in the automation and assembly of a variety of optoelectronic devices such as couplers, fiber optic couplers, fused biconical tapered couplers, switches, optical switches, wave-division multiplexers, filters, attenuators, polarizers, waveguides, sensors, fiber optic sensors, connectors, fiber optic connectors, pigtails, fiber optic pigtails, patch cords, fiber optic patch cords, transmitters, fiber optic transmitters, receivers, fiber optic receivers, amplifiers, an optical amplifier, a fiber optic amplifier and other similar devices and/or components. By using a knowledge based model packaging and assembly technique for the automation of photonic systems, the system of the present invention overcomes certain limitations of current photonic automation systems. This knowledge based model automation technique requires accurate and efficient optical models. In that respect, the system preferably employs validated existing optical models and/or new advanced models for complex devices and systems.

Knowledge based models provide a new paradigm for photonic automation. Previous device and process knowledge are exploited in on-line control loops to optimize design, assembly and packaging of devices such as optoelectronic devices. Not only will this decrease the cost of system assembly and packaging, including alignment, this technique will employ existing capital equipment infrastructure (from semiconductor and industrial automation) and increase the system performance in terms of bit error rate (BER), signal-to-noise ratio (SNR), insertion loss, cross-talk, and coupling. As device and system designs become more complex, the advantages of this technique will be magnified.

Figure 2:
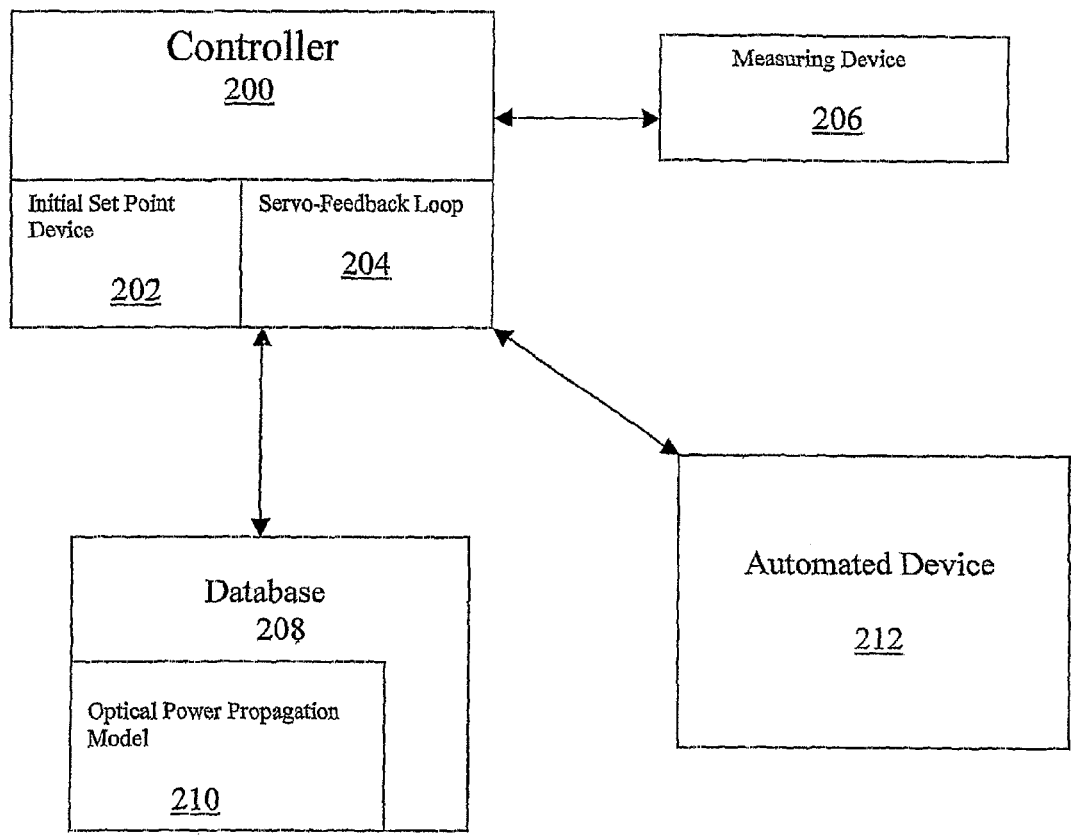
FIG. 2 shows an overview of the system of the present invention

FIG. 2 shows a general overview of one embodiment of a system in accordance with the present invention. Controller 200 is comprised of an initial set point device 202, and a servo-feed loop 204. Controller 200 may typically be a CPU or other processing device that is connected to the overall assembly system. Alternatively, controller 200 could be comprised of a plurality of processors connected to the system via the Internet, or by wireless connections.

The initial set point device 202 employs a knowledge-based model 210 received from a database 208 in order to calculate the initial set point $X_0$ used by the system. In one preferred embodiment, the knowledge-based mode 210 is an optical power propagation model. However, other optical waveforms characteristics and features can could alternatively be employed as the basis of the knowledge-based model 210, or as a portion of knowledge-based model 210, in order maximize the efficiency of the system. Other features or characteristics can be, for example, optical intensity, optical phase, optical polarization and combinations thereof. The database 208 can be a CPU, or can be comprised of on-line storage devices. The database 208 can be maintained at a separate locality from the assembly and be operated independently to supply the model 210 to various systems located at different locations. The controller 200 could then download the appropriate model 210 when needed. Alternatively the database 208 could be stored on the same CPU as the controller 200.

The servo-feed back loop 204 uses the initial set point $X_0$ and at least one measurement obtained from the measuring device 206 to operate the automated device 212. The measurement obtained is typically that of an optical feature or characteristic such as optical power, optical intensity, optical phase or optical polarization, and can be measured in a variety of manners. Alternatively one or more other measurements could be made by the system and the set point could be established based upon that measurement or a combination of different measurements. A measurement could be made of the optical intensity, optical phase, optical polarization, and combinations thereof. The automated device 212 then operates to assemble the components of the device. An artisan familiar with the assembly and packaging of optoelectronic devices would be familiar with the range and scope of suitable automated devices that can be used by the system for packaging and alignment of components.

Figure 3:
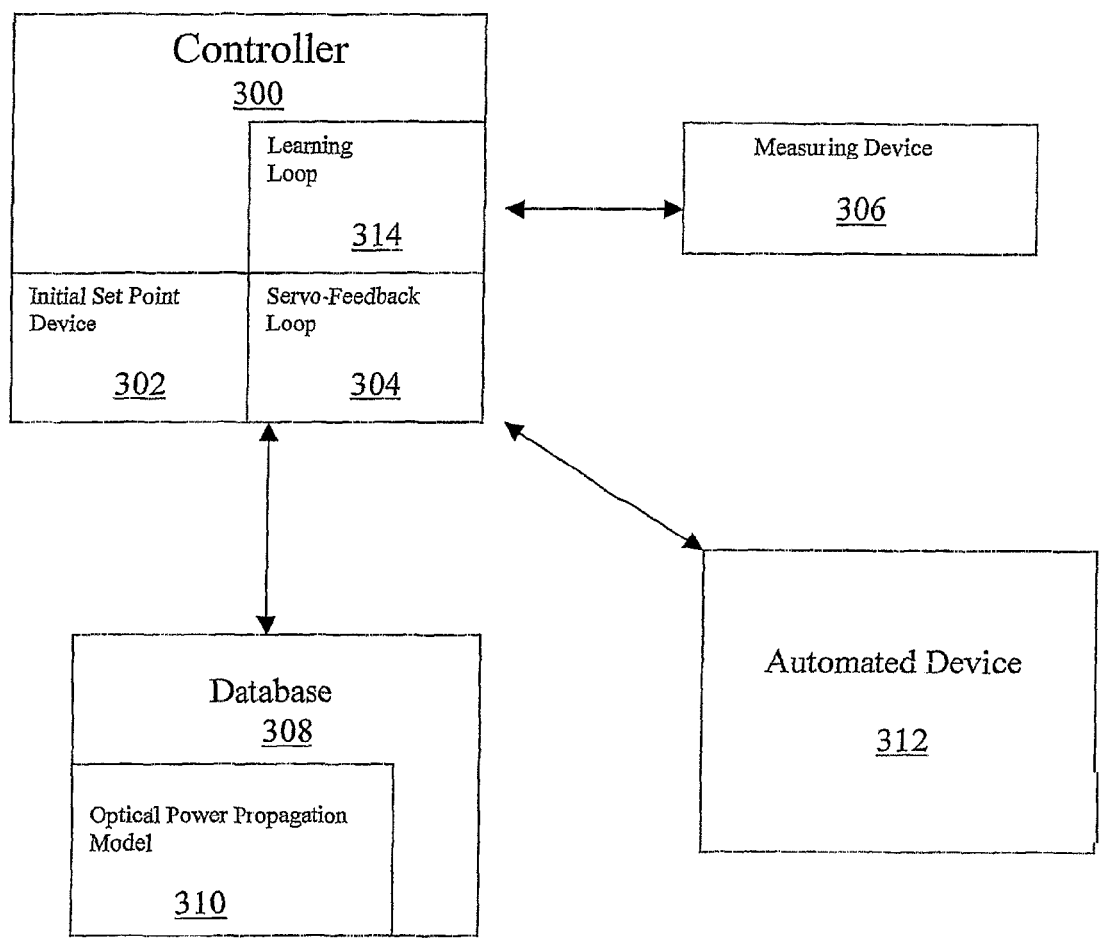
FIG. 3 shows an overview of another embodiment of the system of the present invention including a learning loop.

FIG. 3, shows an alternative embodiment of a system in accordance with the present invention. This alternative embodiment additionally includes a learning loop 314. Controller 300 comprises an initial set point device 302 and a servo-feedback loop 304, however it also includes learning loop 314. Learning loop 314 operates within the system to help control the automated device 312 in an improved manner. The controller 300 will receive a knowledge-based model 310 from the database 308, and the initial set point device 302 will use the knowledge-based model 310 to provide the initial set point $X_0$. Learning loop 314 monitors measurements taken by measuring device 306 and compares the values in order to improve the set point determination based on the knowledge-based model 310 for future device assembly. This permits the system to make improvements to the knowledge-based model 310 based upon actual conditions occurring during the assembly process.

Although the operation of the system is detailed above, further detail will be provided about the knowledge-based model 310 below. The overwhelming majority of currently deployed control loops are of the simple feedback type, including Proportional (P), Proportional and Integral (PI) or Proportional, Integral, and Derivative (PID). However, in addition to the feedback module, the Model Based Controller of the present invention includes a "feed-forward" element, which determines the initial set point. The feed-forward element is typically based upon a priori knowledge regarding the process to be controlled. Such a controller is denoted as a "Model Based Controller." This family of controllers includes: Model Reference Adaptive Control (MRAC), Internal Model Control (IMC), Model Predictive Control (MPC), and Intelligent Control such as Expert Control, Neurocontrol, and Fuzzy Logic Control.

Figure 4:
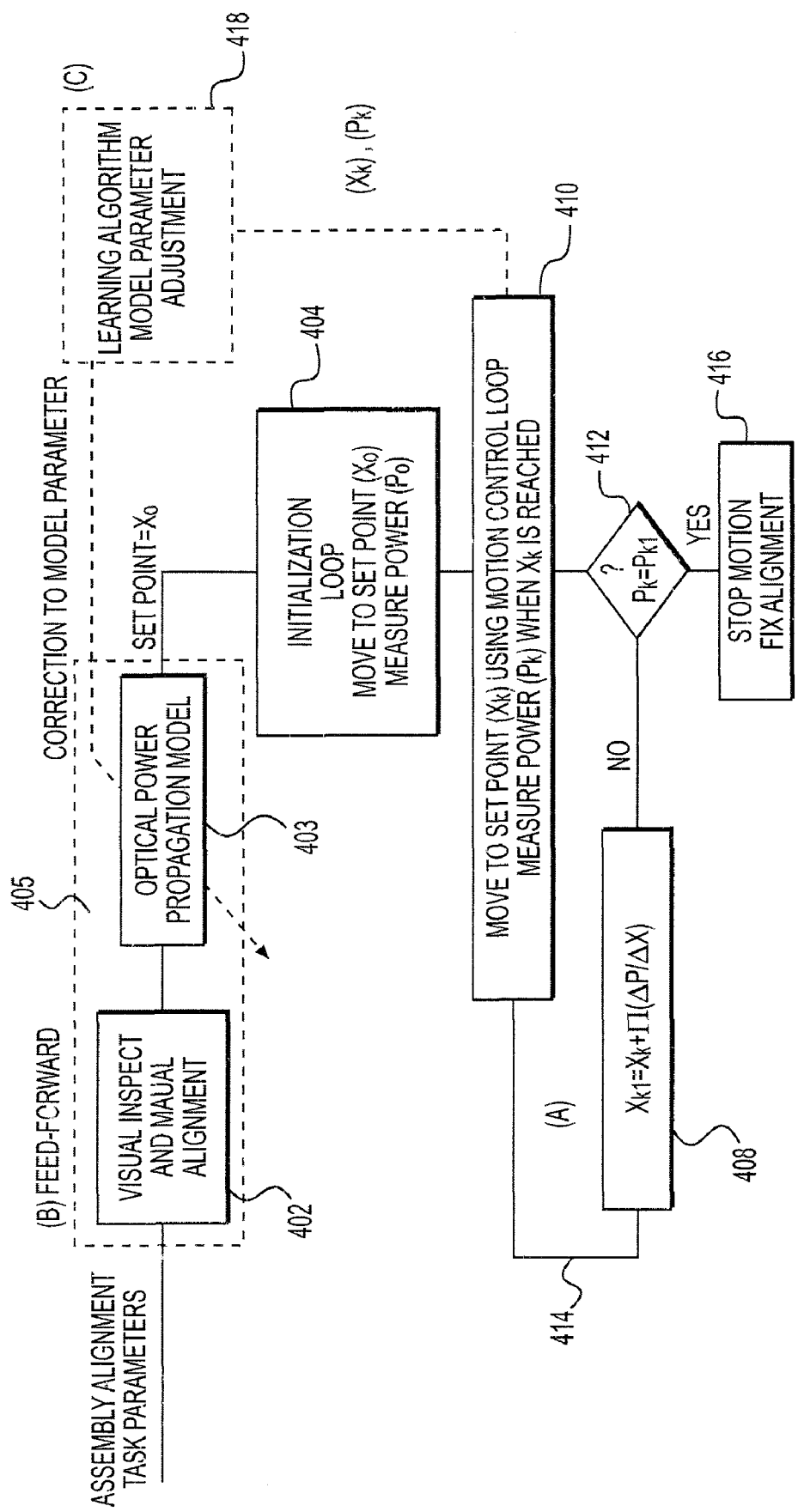
FIG. 4 shows an expanded breakdown of the knowledge-based method of the present invention.

FIG. 4 shows an expanded breakdown of the Model Based method employed by the system of the present invention. As seen in the figure, there are three main components of the control algorithm. The innermost servo-feedback loop 414, shown in FIG. 4, functions in a similar manner as the servo-feedback loop, servo-feedback loop 414 can be an off-the-shelf servo feedback loop, typically a PID controller. The servo-feedback loop 414 performs a gradient ascent 408 on the measured optical power P and attempts to converge on the local maximum optical power by comparing consecutive power readings $P_k$ and $P_{k-1}$ 412 at configurations $x_k$ and $x_{k-1}$. Once convergence is complete, the system proceeds to stop motion step 416. A gradient, $(P_k-P_{k-1})/(x_k-x_{k-1})$, is formed which guides the axis motion to the next configuration, $x_{k+1}$:

$$x_{k+1}=x_k+\eta((P_k-P_{k-1})/(x_k-x_{k-1}))$$

where, $\eta$ is the gradient ascent coefficient, which is the resolution of the step. Motion control step 410 performs the function of adjusting the optical components based on the output of servo-feedback loop 414. However, in this case, the servo-feedback loop 414 is initialized with a different, more advanced set point $X_0$, as described below.

Figure 1:
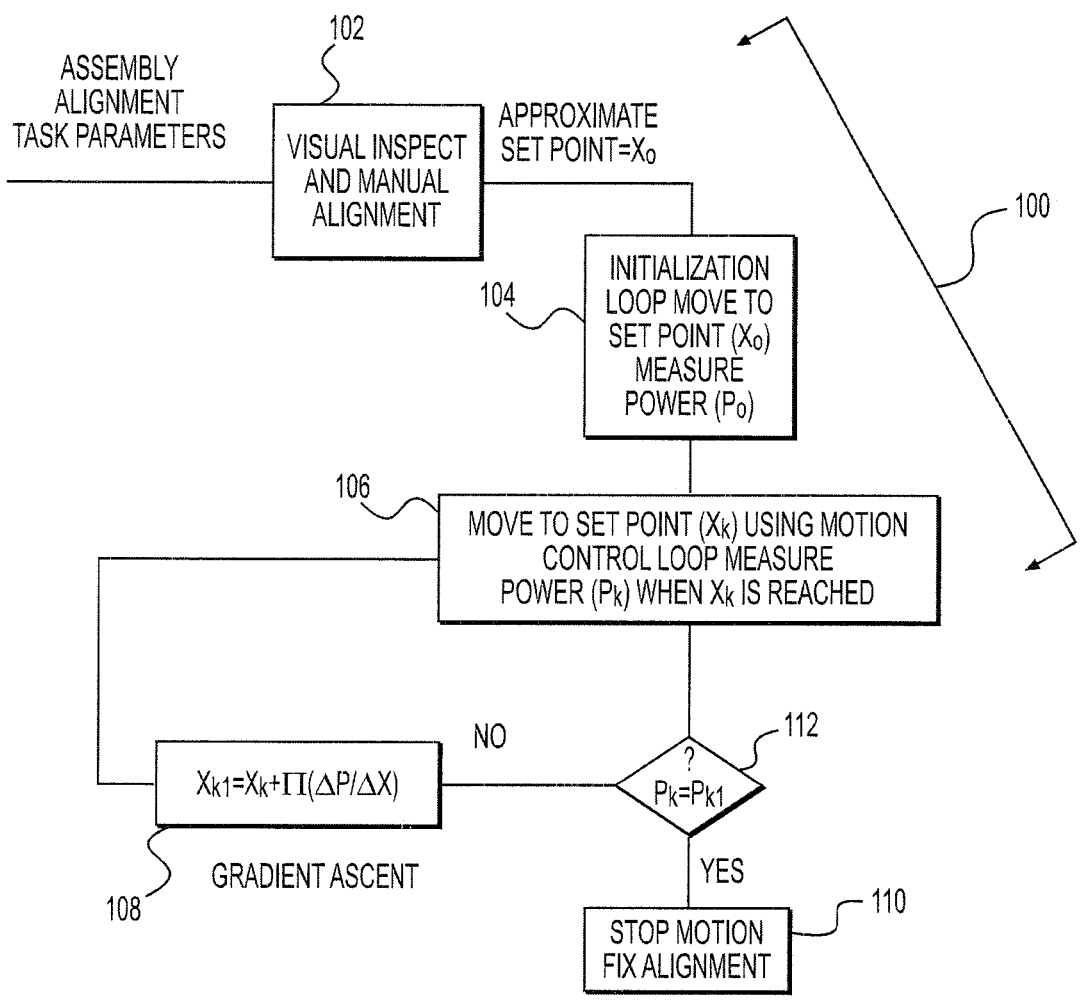
FIG. 1 shows a prior art method for performing automated optoelectronic packaging.

The feed-forward loop 405, denoted (B) in FIG. 4, provides the servo-feedback loop 414 with a "smart" initial set point to track. There can be a visual inspection and manual alignment 402, but use is also made of an optical power propagation model 403. The "smart" set point is selected by the initialization loop 404 on the basis of a properly derived, optical power propagation model 403, which can be stored in a database or computed on-line. The optical power propagation model 403 is device and assembly task specific, that is, different devices with different alignment and assembly tasks will possess unique power distribution functions. As new assembly tasks are submitted to the control machinery (e.g., inputs to the feed-forward block), the model 403 is activated and generates a new set point for the inner servo-feedback loop 414 to track and lock onto. This information is used in the initialization loop 404. It is emphasized that $X_0$ generated by the knowledge based model control method, in general, is different from the value of $X_0$ presently produced by the controller seen in FIG. 1. This new $X_0$ position forecasts a knowledge based model nominal configuration for maximum power transfer.

The knowledge based model control method can be derived from a set of known parameters for the optoelectronic device. For example, an optical power propagation model can be derived from set of one or more of the following parameters for optoelectronic devices: alignment factors, type of assembly task, material type, geometry, dimensions, design tradeoffs and the assembly apparatus. Therefore the system can take into account a wide range of environmental factors as well as assembly and automation factors in developing the control method. This information can be used for the optimization of the design of the automation system itself and/or the components of the device. Assembly machinery can be adjusted as well.

In an alternative embodiment the system of the present invention further includes a learning loop 418. Learning loop 418 is preferably the outermost loop in order to provide opportunities for the system to improve upon its knowledge-based model and adjust its accuracy on the basis of "experienced evidence" or a mismatch between expected power and measured power at a specific axes configuration. The learning loop is preferably only activated at a lower sampling frequency for specific and appropriate tasks. The data received by moving to set point $X_k$ using the motion control loop and the measuring of the power $P_k$ when $X_k$ is reached is used by both the servo-feedback loop 414, and the learning loop 418. The learning loop will use the data in its learning algorithm and model parameter adjustment. The learning loop 418 can employ measurements of optical power, alignment factors, material features, geometry and dimensions to adjust the knowledge based model. The learning loop can also use statistical quality control or field data based on experience of handling the device itself. A manufacturing database can be updated based on information gathered during use of the machinery or maintenance, or observations made from other similar systems employed in the automation of the packaging and assembly. Learning loop 418 is further explained with respect to FIGS. 5-7 discussed below.

Figure 5:
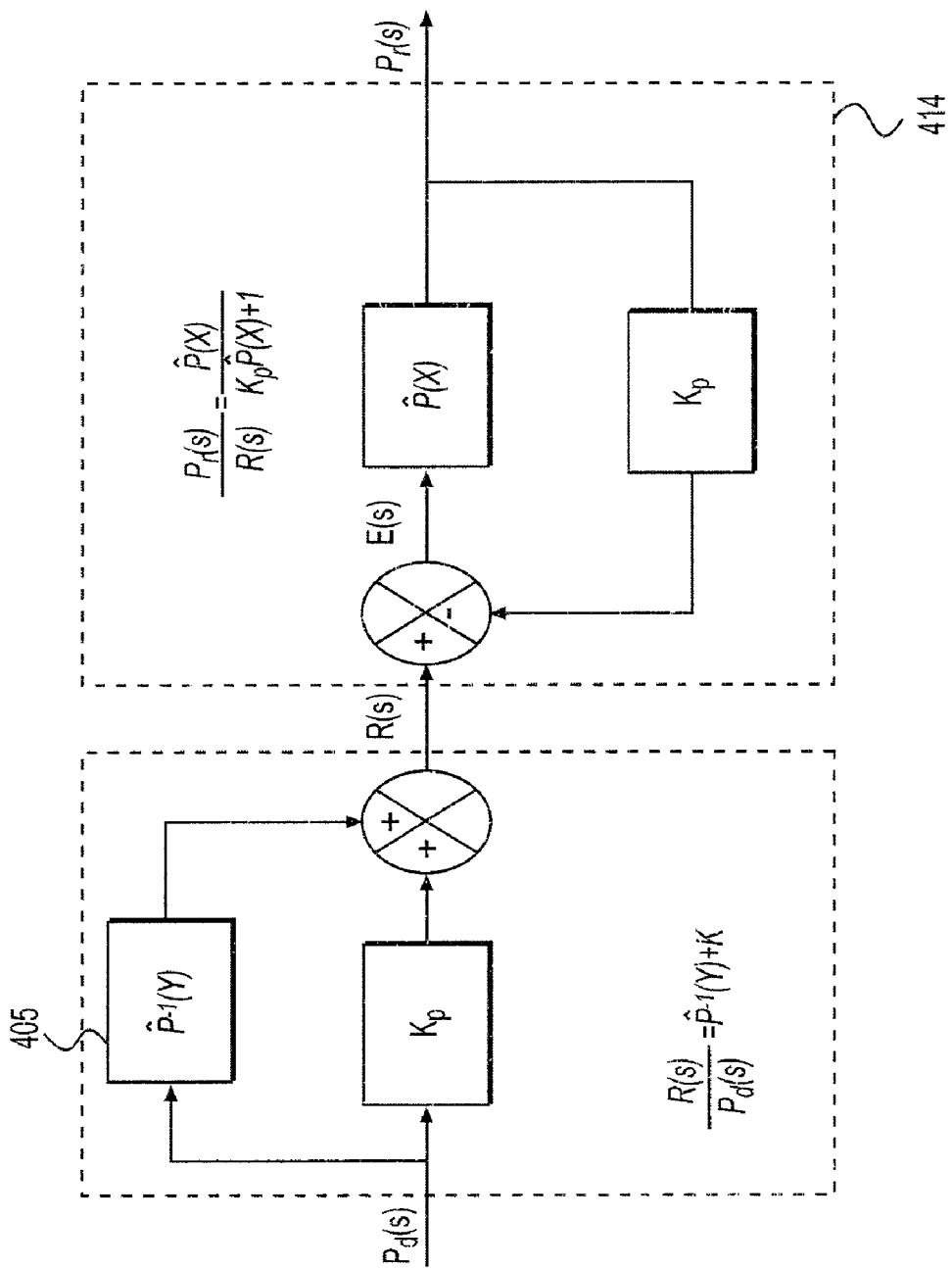
FIG. 5 shows a diagram of simple model based control.

FIG. 5 shows the control algorithm block diagram of the feed forward loop 405 and feedback loop 414. The feed forward loop 405 is defined by the equation shown in FIG. 5. Feedback loop 414 and its defining transfer function are also shown in FIG. 5. In the figure, the input is Optical Power Desired, $P_d$, and the output is Optical Power Received, $P_r$. The control plant is denoted as P, and the gain is noted as $K_p$.

To effectively use the knowledge based model control, models of the control plant, $\hat{P}$, and its inverse, $\hat{P}^{-1}$, must be determined for feed forward loop 405. If done accurately, feed-forward loop 405 can position the mechanics in the vicinity of the globally optimal configuration. If $\hat{P}=P$, where P is the actual behavior of the plant, perfect tracking can be obtained, mathematically shown by multiplying the transfer function of the two sub loops together:

$$\frac{P_r(s)}{P_d(s)} = \frac{R(s)}{P_d(s)} \cdot \frac{P_r(s)}{R(s)}$$

$$= \hat{P}^{-1}(Y) + K_p \frac{\hat{P}(X)}{K_p \hat{P}(X) + 1}$$

$$= \hat{P}(\hat{P}(X)) + K_p \frac{\hat{P}(X)}{K_p \hat{P}(X) + 1}$$

$$= \frac{1 + K_p \hat{P}(X)}{K_p \hat{P}(X) + 1}$$

$$= 1$$

As seen, feed forward loop 405 relies on accurate models to determine the set point. Therefore, the optical power propagation model is important in providing accurate models and learning loop 418 plays a role in providing an accurate power propagation model.

In the systems that are to be automated, the structure of the systems and all of its parameter values are assumed to be known. Optical propagation models are then used to derive a mathematical representation of the system. Often, all of the required information is not available, or models could have inaccuracies. In such a case, a system model can be approximately determined from experimental measurements of available inputs and outputs. When the structure of the unknown system is known, but certain parameter values are unknown, system identification is reduced to a problem of parameter identification. This identification technique is explored below with respect to optoelectronic automation.

An angular spectrum technique is used to model optical propagation between system components, including optical sources, fibers, devices, apertures, and detectors, due to its accuracy and computational efficiency. The angular spectrum technique is an exact solution to the Rayleigh-Sommerfeld formulation, a scalar modeling technique without near and far field approximations. The technique is implemented by performing a Fourier transform on the complex optical wavefront transforming from the spatial domain to the frequency domain, multiplying these frequencies by a transfer function describing the propagation medium, and returning to the spatial domain with the use of an inverse Fourier transform. However, there are possible sources of errors in the optical modeling technique. The first is the use of a discrete Fourier transform in place of a continuous Fourier expression. Other errors can be found due to aliasing and sampling conditions.

To combat possible errors in the knowledge based model, learning loop 418 is implemented to improve the models that are used for control functions. The learning model identification for learning loop 418 is activated at a lower sampling frequency for specific and appropriate tasks. This technique provides opportunities for the system to improve upon its power model and adjust its accuracy on the basis of "experienced evidence" or a mismatch between expected power and measured power at a specific axes configuration. Details of the learning identification technique for learning loop 418 are explained below.

The system to be identified is described by $\dot{y}=f(y,u,\beta)$, where y is the output, u is the input, and $\beta$ is a vector of all of the unknown parameters. A mathematical model with the same form, with different parameter values $\hat{\beta}$ is used as a learning model, such that $\dot{\hat{y}}=f(\hat{y},u,\hat{\beta})$. The output error vector, e, is defined as $e=y-\hat{y}$. The goal of the learning loop is to manipulate $\hat{\beta}$ such that the output is equal to zero. The implicit assumption is that e is determined entirely by $\hat{\beta}$ and is zero when $\hat{\beta}=\beta$. It follows that $$e = e(\hat{\beta}) \text{ and } \dot{e} = \left(\frac{\partial e}{\partial \hat{\beta}}\right)\dot{\hat{\beta}}.$$

The Lyapunov function, v(e), is used to determine the stability of the system. In this case, v(e) is selected as a positive definite function of e (that is, if v(0)=0 then v(e)>0 for all e≠0) and is defined as $$v(e) = \frac{1}{2}e^T Q e,$$

where Q is a symmetric matrix. Therefore, the derivative of the function is $$\dot{v}(e) = e^T Q \frac{\partial e}{\partial \hat{\beta}} \dot{\hat{\beta}}.$$

If $\dot{v}(e)$ could be made negative definite (that is, if v(0)=0 then v(e)<0 for all e≠0) by properly choosing $\hat{\beta}$, then e would approach zero asymptotically. Selecting $$\dot{\hat{\beta}} = -\varepsilon\left(\frac{\partial e}{\partial \hat{\beta}}\right)^T Q e,$$

with $\varepsilon$ as a positive scalar constant, gives a negative semi definite (that is, v(e)≦0 for all e≠0) expression $$\dot{v}(e) = -\varepsilon e^T Q \left(\frac{\partial e}{\partial \hat{\beta}}\right)\left(\frac{\partial e}{\partial \hat{\beta}}\right)^T Q e.$$

Even though not negative definite, this learning model technique for learning loop 418 is capable of providing system identification in many cases.

Before this can be implemented, the sensitivity matrix, $$\frac{\partial e}{\partial \hat{\beta}},$$

must be computed. y does not depend on $\hat{\beta}$, therefore, $$\frac{\partial e}{\partial \hat{\beta}} = -\frac{\partial \hat{y}}{\partial \hat{\beta}} \cong S.$$

Since the initial conditions for the model $\hat{y}(0)$ can be selected independently of $\hat{\beta}(0)$, the initial condition for the sensitivity matrix S is S(0)=[0]. The learning model adjustment scheme consists of assuming initial values for $\hat{\beta}(0)$, adjoining the sensitivity equations to the model equations and using $\dot{\hat{\beta}}=-\varepsilon S^T Q e$. The learning model identification technique for learning loop 418 can be visualized in terms of the control diagram shown in FIG. 6.

As in all gradient adjustment schemes, the parameter $\varepsilon$ must be properly selected. If $\varepsilon$ is too large, the schemes will diverge, and if $\varepsilon$ is too small, then $\hat{\beta}$ will approach $\beta$ very slowly. General conditions under which this technique converges are difficult to determine analytically. Selection of a suitable $\varepsilon$ and the weighting matrix Q are determined by a trial and error process.

To show an example of this learning identification theory for learning loop 418, a system with two unknown variables having an input-output differential equation $\ddot{y}+a\dot{y}=Ku$ is discussed below. In this example, a and K are unknown (i.e., need to be learned), and the variables u, y, and $\dot{y}$ can be measured. Using the learning identification theory discussed above, the equations necessary to implement the learning model identification scheme are $y=x_1$ and $\dot{y}=x_2$, resulting in the derivate of the state $$\text{variable } \dot{x} = \begin{bmatrix} 0 & 1 \\ 0 & -a \end{bmatrix} x + \begin{bmatrix} 0 \\ K \end{bmatrix} u.$$

In the system, an estimated model of $$\dot{\hat{x}} = \begin{bmatrix} 0 & 1 \\ 0 & -\hat{a} \end{bmatrix}\hat{x} + \begin{bmatrix} 0 \\ \hat{K} \end{bmatrix}\hat{u}$$

is used; therefore, the error is defined as $e=x-\hat{x}$. The necessary sensitivity coefficients are contained in $$S = \begin{bmatrix} \frac{\partial e_1}{\partial \hat{a}} & \frac{\partial e_1}{\partial \hat{K}} \\ \frac{\partial e_2}{\partial \hat{a}} & \frac{\partial e_2}{\partial \hat{K}} \end{bmatrix},$$

where $$e = \begin{bmatrix} y-\hat{y} & \dot{y}-\dot{\hat{y}} \end{bmatrix}^T, \frac{\partial e}{\partial \hat{a}} = -\frac{\partial \hat{x}}{\partial \hat{a}},$$

and $$\frac{\partial e}{\partial \hat{K}} = -\frac{\partial \hat{x}}{\partial \hat{K}}.$$

Figure 7:
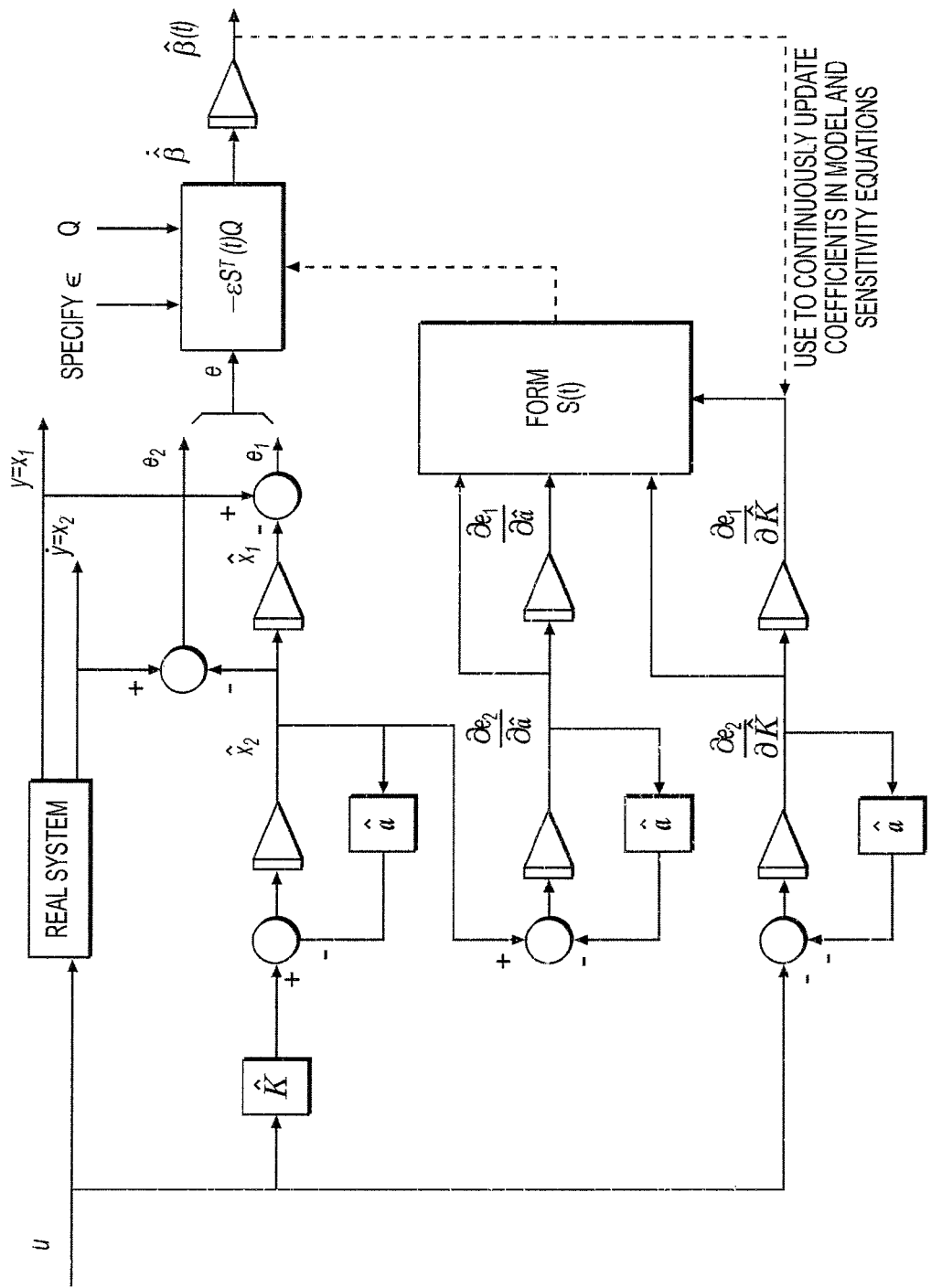
FIG. 7 shows a diagram of simulation of a learning loop technique for two unknowns.

The initial conditions on all four sensitivity equations are zero. FIG. 7 gives the simulation diagram for this method.

Using a knowledge based model control technique provides many advantages over current automation techniques. For example, the technique can support the packaging of systems not emitting optical power in an ideal uni-mode power distribution. Therefore, if the optical power distribution has many peaks and valleys, using a knowledge-based model enables prior knowledge of which peak will nominally contain the most optical power. From the position of the power peak, optimal alignment can be obtained, as the control loop avoids finding and being positioned in local power maximums. Unavoidable errors, such as manufacturing errors and misalignments, will be partially corrected with a PID feedback loop, found in addition to the feed-forward loop. An additional advantage of the technique, when compared to today's standards, is the time that the automation control loop takes to track the peak power position. It can greatly decrease this time with the feed-forward block of the algorithm. Using advanced simulations, an initial position that is close to the optimal position can be found. Therefore the system does not have to search the complete optical field space. This reduces the required field of view and required resolution, which can lower the cost of the automation sensors, software, and hardware. Also, as the number of packages to be assembled increases, the packaging time of an individual device is critical. This time directly effects the packing time of the entire lot of devices, which is an important cost factor for large manufacturing runs.

For example, having prior knowledge of how tilts of the fiber or waveguide affect the performance of the system is important. Tilts are the most challenging aspect of alignment using the current methods. To use gradient ascent to position in the x and y directions is fairly straightforward for a uni-mode optical power distribution. However, when adding the complexity of tilts into the alignment, the control loop dramatically slows down as the number of parameters required to optimize the alignment position increases. With the knowledge based model control algorithm, the system can reduce the costly time of optimizing tilted, and more generally, multi-axis systems.

2. Optical Modeling Techniques a. Rayleigh-Sommerfield Technique

As part of the knowledge based model control system for the automation of photonic devices, there is a need to perform accurate, yet efficient, optical modeling for the feed-forward portion of the control algorithm. In this section, an optical modeling and simulation technique that is used in the system of the present invention is described in detail.

When optical wavefronts interact with the small feature sizes of micro-systems, many of the common optical propagation modeling techniques become invalid, and full vector solutions to Maxwell's equations are required for accurate simulation. However, these accurate solutions are computationally intensive, making interactive simulation between the control loop and the optical modeling tool almost impossible. To reduce the computational resources of modeling the optical wavefront in free-space by the vector solutions, a scalar representation can be used. For example, the Rayleigh-Sommerfeld formulation can be employed. The Rayleigh-Sommerfeld formulation is derived from the wave equation for the propagation of light in free-space from the aperture plane ($\xi,\eta,0$) to a parallel observation plane (x,y,z). The Rayleigh-Sommerfeld formulation is mathematically shown below:

$$U(x, y, z) = (z/j\lambda) \iint_\Sigma U(\xi, \eta, 0)(\exp(jkr))/r^2 \partial\xi\partial\eta$$

where, $r=(z^2+(x-\eta)^2+(y-\xi)^2)^{1/2}$, $\Sigma$ is the area of the aperture, and z is the distance that the light is propagated from an aperture plane (z=0) to the observation plane. The formulation is valid as long as both the propagation distance and the aperture size are greater than the wavelength of light. These restrictions are based on the boundary conditions of the Rayleigh-Sommerfeld formulation, and the fact that the electric and magnetic fields cannot be treated independently at the boundaries of the aperture. To compute the complex wavefront at the observation plane, each plane is discretized into an N×N mesh. Using a direct integration technique, the computational order of the Rayleigh-Sommerfeld formulation is $O(N^4)$. In the interest of reducing the computational load of using a full scalar technique, the Rayleigh-Sommerfeld formulation has been recast using an angular spectrum technique.

b. Angular Spectrum Technique

As an alternative to direct integration over the surface of the wavefront, the Rayleigh-Sommerfeld formulation can also be solved using a technique that is similar to solving linear, space invariant systems. Re-examining the Rayleigh-Sommerfeld formulation, it can be seen that the equation is in the form of a convolution between the complex wavefront and the propagation through free space. The Fourier transform of the complex optical wavefront results in a set of plane waves traveling in different directions away from the surface. Each plane wave is identified by the components of the angular spectrum. At the observation plane, the plane waves are summed together by performing an inverse Fourier transform, resulting in the propagated complex optical wavefront at the observation plane.

To solve the Rayleigh-Sommerfeld formulation with the angular spectrum technique, the complex wavefront at the aperture plane is first examined. The wave function U(x,y,z) has a 2D Fourier transform, $A(v_x,v_y,0)$, in terms of angular frequencies, $v_x$ and $v_y$.

$$A(v_x,v_y,0)=\iint U(x,y,0)\exp[-j2\pi(v_x x+v_y y)]\partial x \partial y, \text{ where } v_x=\sin\theta_x/\lambda \text{ and, } v_y=\sin\theta_y/\lambda$$

From the equation, the plane waves are defined by $\exp[-j2\pi(v_x x+v_y y)]$ and the spatial frequencies define the directional cosines, $\sin(\theta_x)$ and $\sin(\theta_y)$, of the plane waves propagating from the origin of the aperture plane's coordinate system.

The free-space transfer function in the frequency domain has been computed by satisfying the Helmholtz equation with the propagated complex wave function, U(x,y,z):

$$A(v_x,v_y,z)=A(v_x,v_y,0)\exp\{jz2\pi(1/\lambda^2-v_x^2-v_y^2)^{1/2}\}$$

This describes the phase difference that each of the plane waves, differentiated by the spatial frequencies, experiences due to the propagation between the parallel planes. Therefore, the wave function after propagation can be transformed back into the spatial domain with the following inverse Fourier transform:

$$U(x,y,z)=\iint A(v_x,v_y,0)\exp\{jz2\pi(1/\lambda^2-v_x^2-v_y^2)^{1/2}\}\exp[j2\pi(v_x x+v_y y)]\partial v_x \partial v_y$$

The advantage of using the angular spectrum to model light propagation is that the method is based on the Fourier transform. The computational order of the FFT for a 2D input is $O(N^2 \log_2 N)$, which allows for simulation to be performed on-line in the knowledge based model control loop.

The techniques discussed above are not exclusive of the techniques available, and other methods of developing knowledge-based models could be used within the scope of the present invention. In the preferred embodiment Rayleigh Sommerfeld formulation or an angular spectrum solution to the Rayleigh Sommerfeld formulation is used. However, Ray analysis or Gaussian analysis (Salech, B. E. A. and Teich, M. C., *Fundamentals of Photonics* (see Wiley, New York), 1991, or Far (Fraunhofer) Field analysis or Near (Fresenal) Field analysis (see Hecht, E., *Optics*, Second Edition (Addison- Wesley Publishing Company, 1987), or these methods can be used as a part of the knowledge based model in the development of the automation. Also vector solutions to Maxwell's equations (see Scarmozzino, R., Osgood, R. M., Jr., "Comparison of finite-difference and Fourier-trans-form solutions of the parabolic wave equation with emphasis on integrated-optics applications," *Journal Optical Society of America A*, Vol. 8, No 5, May 1991, pp. 725-731) can be used.

3. Examples

To highlight some of the advantages of the knowledge based model, here are some examples comparing the knowledge based model to current, state-of-the-art alignment algorithms. Examined below is the coupling of a wavefront into a fiber in the near field and a more complex system coupling the output of a diffractive element into a fiber array. First a discussion of the equipment setup is presented.

Equipment Set Up

Figure 8:
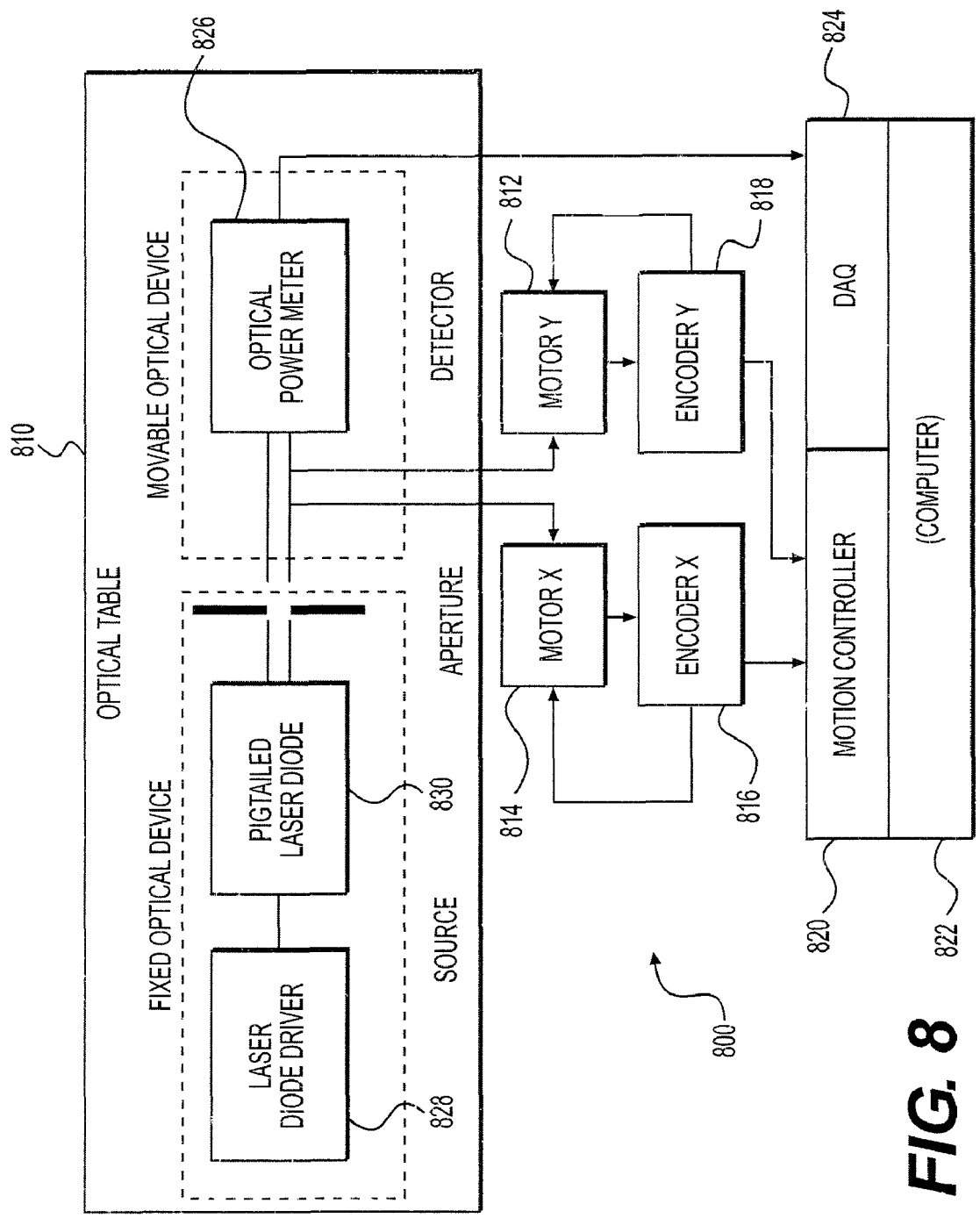
FIG. 8 shows a setup of laser diode-aperture-fiber coupling.
Figure 9A:
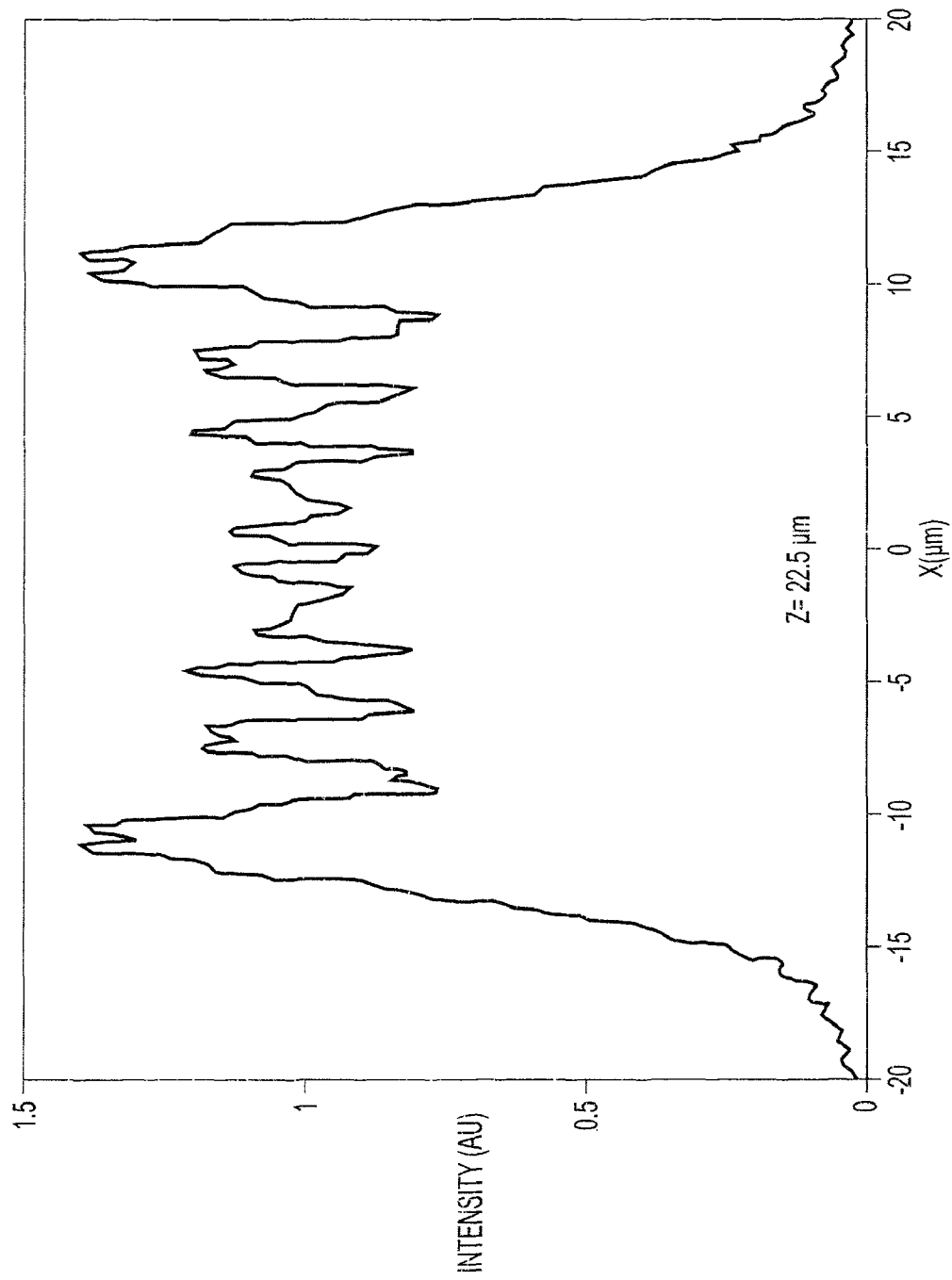
FIG. 9 shows intensity cross-sections of plane wave propagation past an aperture 22.5, 56.25 and 225 μm.
Figure 9B:
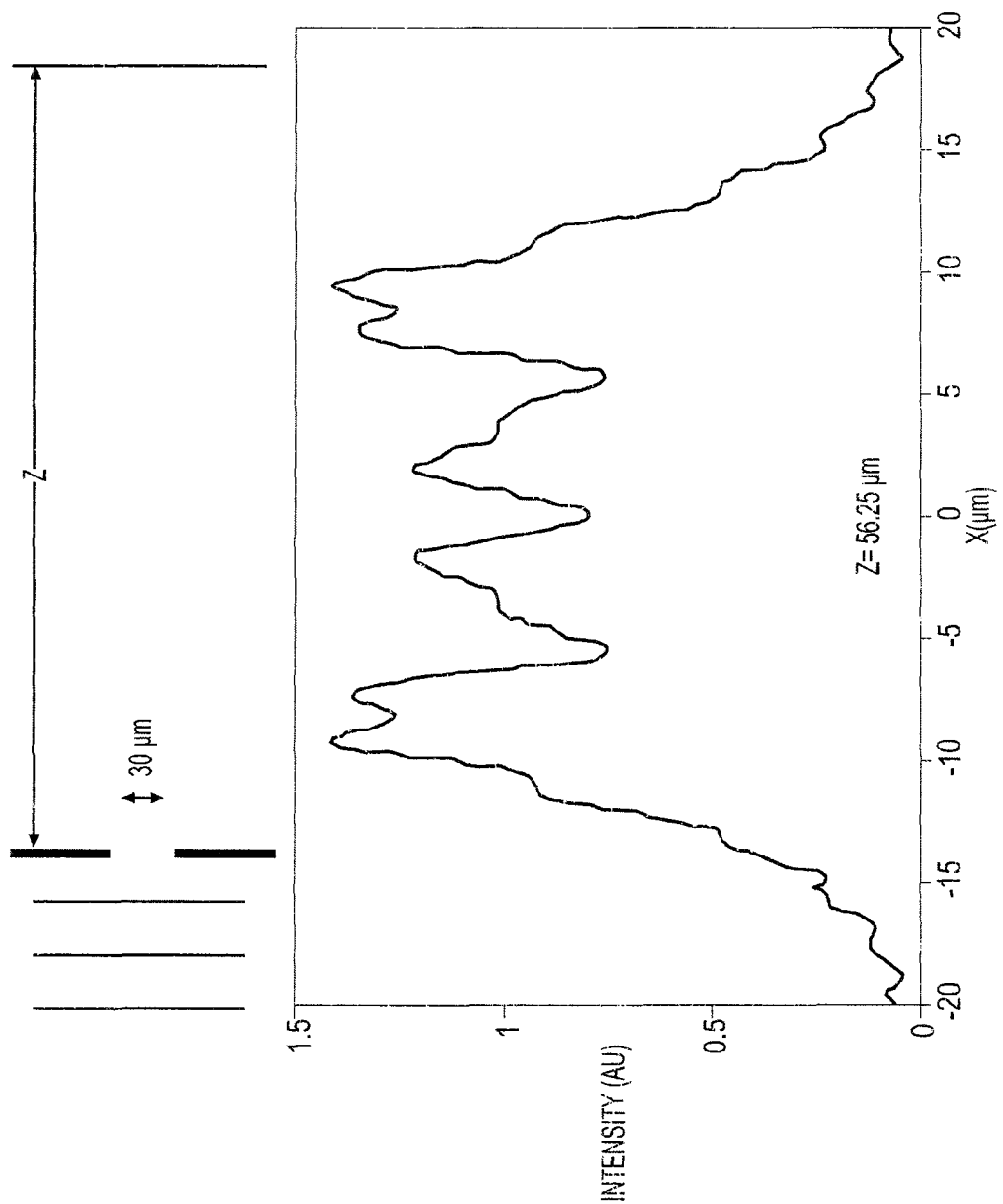
Figure 9C:
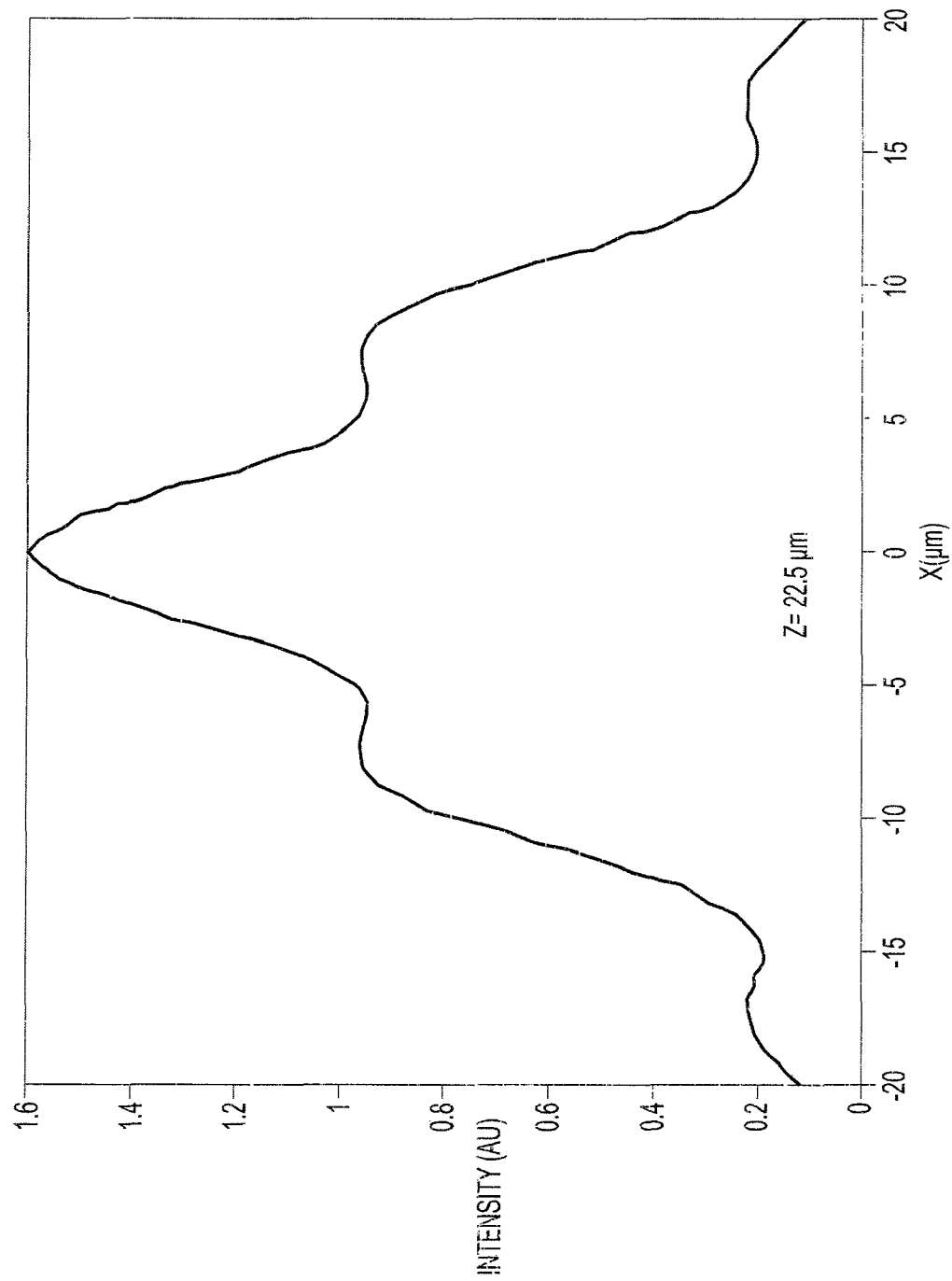

A diagram of a sample test bed 800 is shown in FIG. 8. The sample test bed 800 is illustrative of a possible bed that may be used in combination with Examples 1-4 described in detail below. FIG. 8 shows a diagram of optical table 810, which is an XY table, an X servo motor 814, a Y servo motor 812, an X encoder 816, a Y encoder 818, amplifiers (not shown), DAQ (data Acquisition) 824, an optical power meter 826, a laser diode driver 828, a pigtailed laser diode 830, and a DSP-based motion controller board 820 from Precision Microdynamics Inc.™ The MC8000 motion control board 820 uses a 32-bit floating point DSP that performs path planning, feedback regulation and other real time computations, freeing the host PC for process application. The card supports data rates with the host PC as high as 7.2 Mbytes/s.

Servo motors, 812, 814, are manufactured by BEI™, and are typical "inside-out" brushless DC (BLDC) motors which provide greater output power, higher operating speeds and cleaner, quieter operation than brush-type counterparts. Motors 812, 814 are ideal for sterile environments, since there are no brushes and no particulate is discharged. Because of their inherent reliability and long-term service life, BLDC motors can significantly contribute to lower overall cost of operation and maintenance. The amplifier (not shown), made by AMC™, is a Pulse Width Modulated (PWM) trans-conductance amplifier with a gain of 2.85 Amp/Volt and supply voltage requirement of 70V. The Heidenhain™ LIP 403A encoders, 816, 818, have a grating of 2 µm and maximum speed of 6 m/min, with a sinusoidal output.

The motion control card receives position commands issued by the PC software from feed forward loop 405. Computer 822 calculates a series of positions for each axis along the desired path at the desired speed set by the feed forward loop 405. The motion control card adjusts the signals to the servo amplifiers accordingly, such that servomotors 812, 814 follow the desired path. To make sure that the desired path is followed and the loop is closed, the motion control card repeatedly checks the actual position of the machine's axes obtained from encoders 816, 818 against the commanded position and makes adjustments to keep the difference as small as possible.

The complete system set-up to couple an optical fiber to a laser source is shown in FIG. 8. Optically, 680, 1330, and 1550 nm pig-tailed laser diodes 830 are coupled to single mode fibers, a 501 Newport Driver, and an 1830-C Newport Fiber Receiver are used. The receiver is GBIP interfaced to the computer control. Pigtailed laser diode 830 is attached to the non-moving test bed structure, while the receiver fiber is attached to the controlled optical table 810. The optical power sensor reading is sent to the computer control, which controls the system for position measurement to attach at the point of maximum power.

Example 1

Near Field Alignment

In this example, the coupling of a plane wave propagating through a 30 µm square aperture and an 8 µm fiber in the near field is examined. Under these circumstances, the system of the present invention provides better performance than the current automation method. As discussed above, current alignment automation techniques determine an initial set point through the visualization of the position of the fiber relative to the aperture, and alignment of the geometrical optical axis with center of the fiber core. From this set point, the gradient ascent algorithm is performed to find the positional alignment that provides the maximum power coupled into the fiber. For a square aperture system in which the optical wavefront has propagated into the far field, the wavefront power distribution will be a sine function in the x and y directions, with a power maximum at the geometric center of the system. Therefore, the visualization set point would lead to an attachment for the coupling of maximum power into the fiber.

Figure 6:
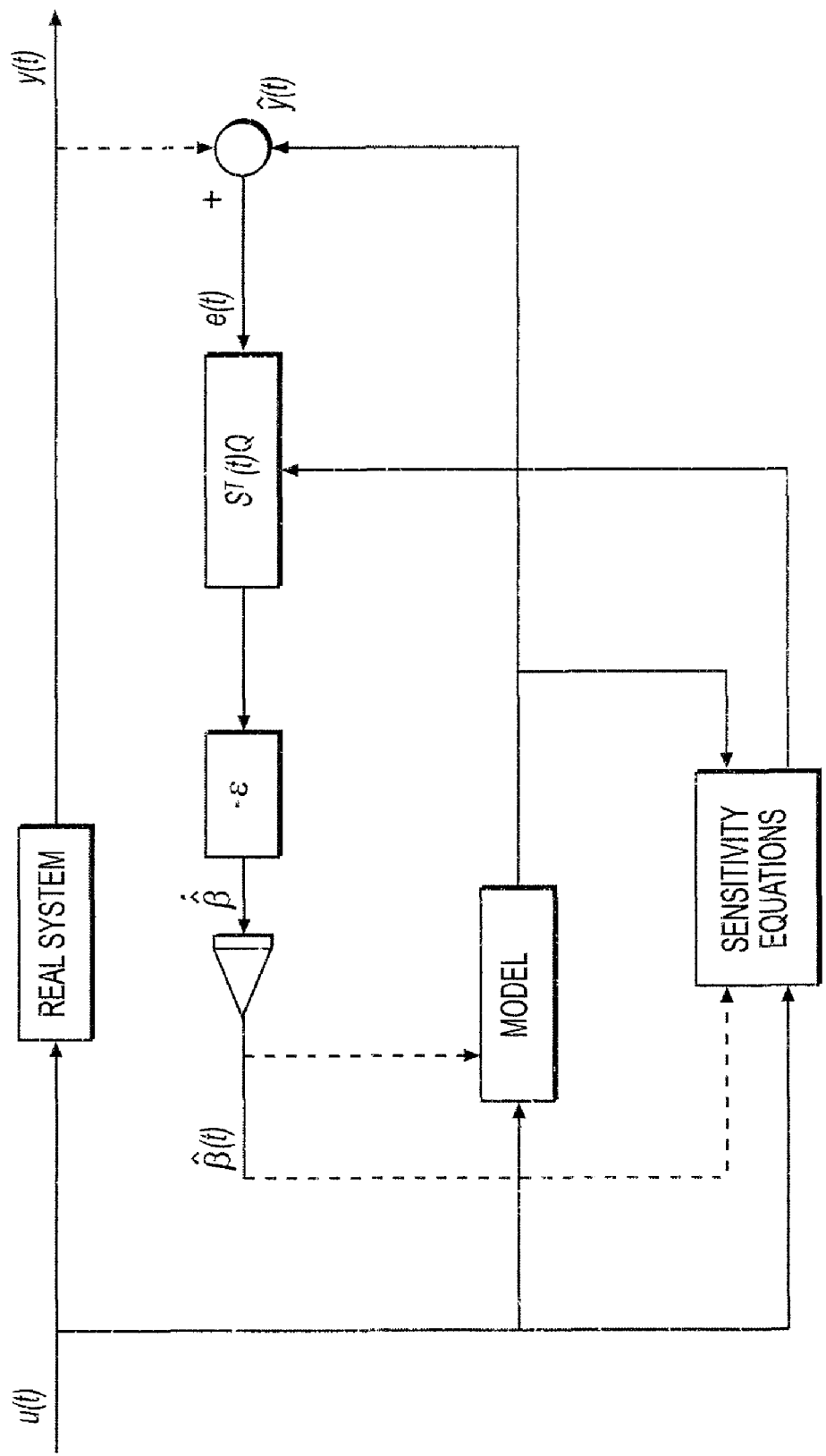
FIG. 6 shows a diagram of a learning model identification technique for a learning loop.

However, if the optical wavefront has only propagated into the near field, the wavefront appears much different than that of the far field pattern, and attachment at the optical geometric axis will lead to a poor system performance. Demonstrating the difference between the near field and the far field, FIG. 6 shows a cross-section of the intensity distribution of a plane wave propagating past a square aperture 22.5, 56.25, and 225 µm. As the wavefront propagates further past the aperture, it starts to move from the near field to the far field as a "Gaussian-like" shape begins to appear in the center of the wavefront. At the top of FIG. 6, a diagram of the plane wave propagating through an aperture is included.

Figure 10A:
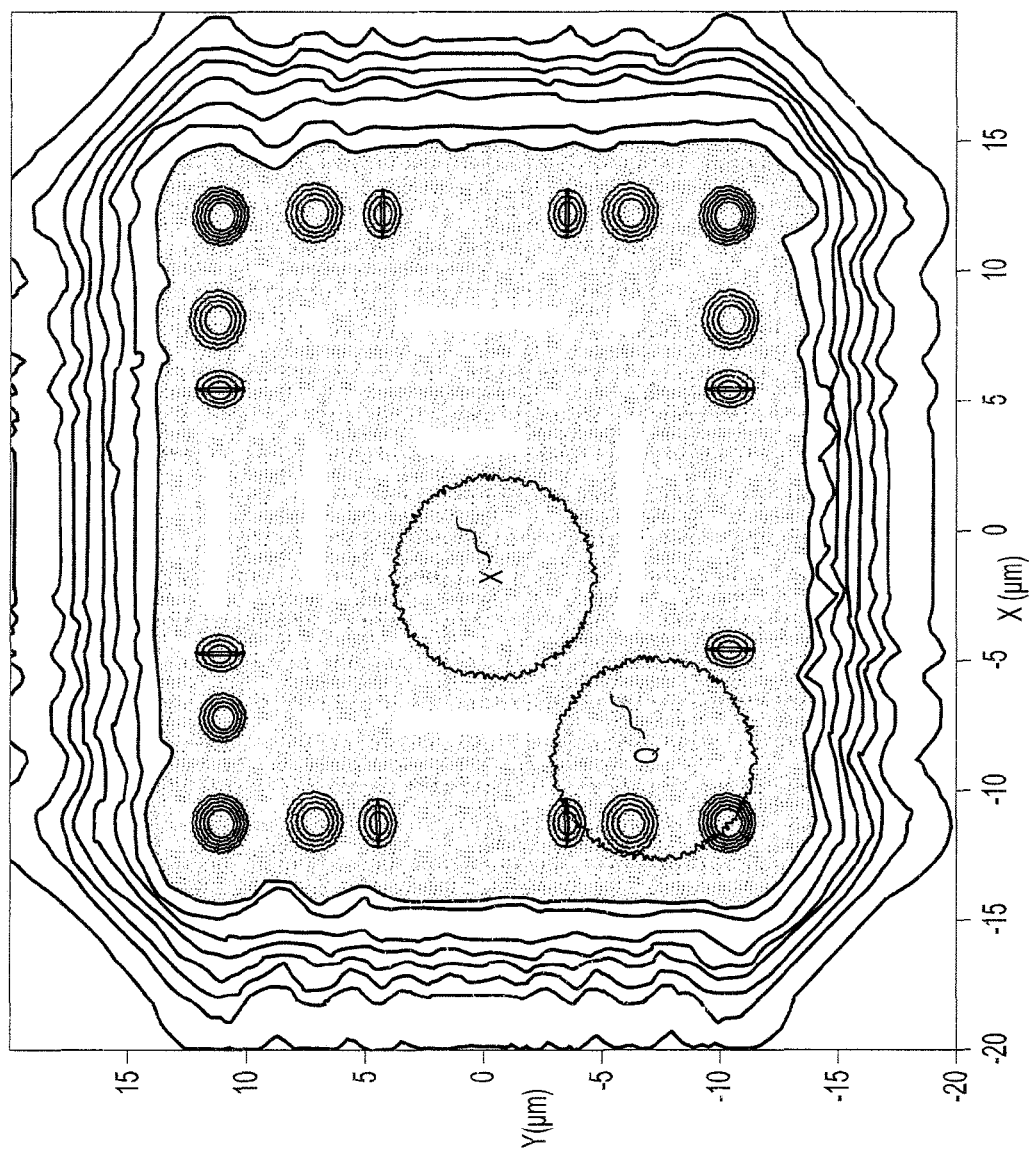
FIG. 10(*a*) shows a contour diagram of the power coupled in an 8 μm fiber a wave front.
Figure 10B:
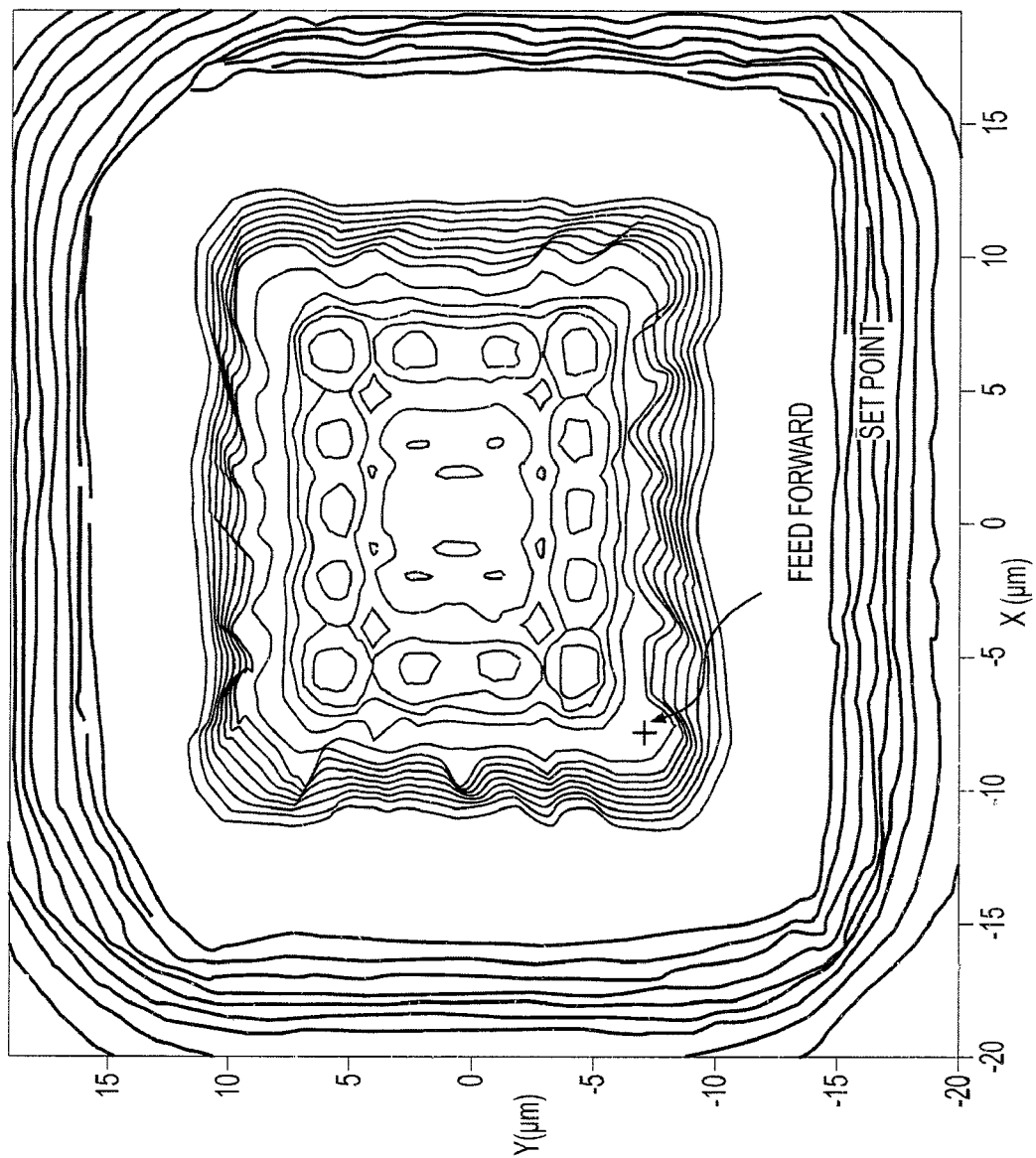

Using the knowledge based model to determine the positional alignment for the maximum power coupled into the 8 µm fiber at a distance of 22.5 µm past the aperture, the entire system is simulated to predict the best feed-forward set point for the control algorithm. The simulation is performed using the angular spectrum technique for solving the Rayleigh-Summerfeld formulation discussed above, since the output intensity distribution and a distribution of the power coupled into the fiber are determined. From the power distribution, the position of the maximum power value is scanned for, which becomes the feed-forward set point in the knowledge based model control algorithm. The graph of the power distribution into the fiber is seen in FIG. 10(a), and the feed-forward set-point is approximately (7,7) µm. The intensity contour of a wavefront propagated 22.5 µm past a 30 µm square aperture is shown in FIG. 10(b).

In FIG. 10(a), the coupling of the fiber using the current state-of-the-art technique and the knowledge based model control algorithm is also compared. The classic technique starts at a position close to the center of the geometrical optical axis and uses the gradient ascent algorithm, which stops the alignment loop at a local power maximum, denoted by the "X" in the figure. In contrast, the knowledge based model control technique starts at the feed-forward position (in this example, it actually starts off of the set point by a couple of microns to simulate possible mechanical and system misalignments) and uses a gradient ascent algorithm to find the global maximum of power coupled into the fiber, denoted by the "O" in the figure.

The paths of the gradient ascent algorithms for both the instant invention's method and the classical method are included on the intensity diagram. In this example, an increase in system performance of approximately 18% is achieved when using the knowledge based model. The knowledge based model peak does not just find the maximum intensity peak, it examines the entire power distribution, and finds the best system performance.

Example 2

Fiber Array Automation

Figure 11A:
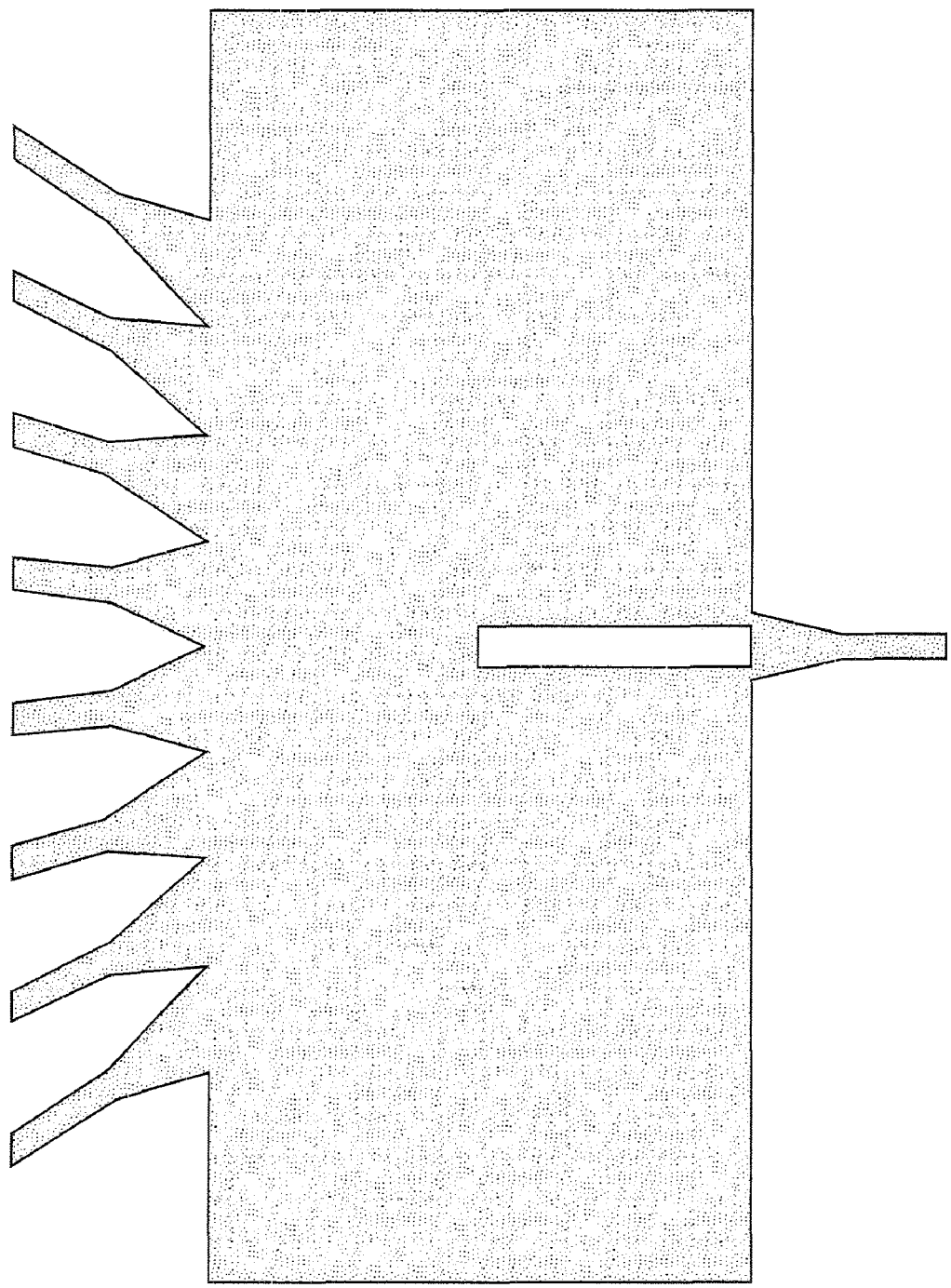
FIG. 11(*a*) shows a star coupler.
Figure 11B:
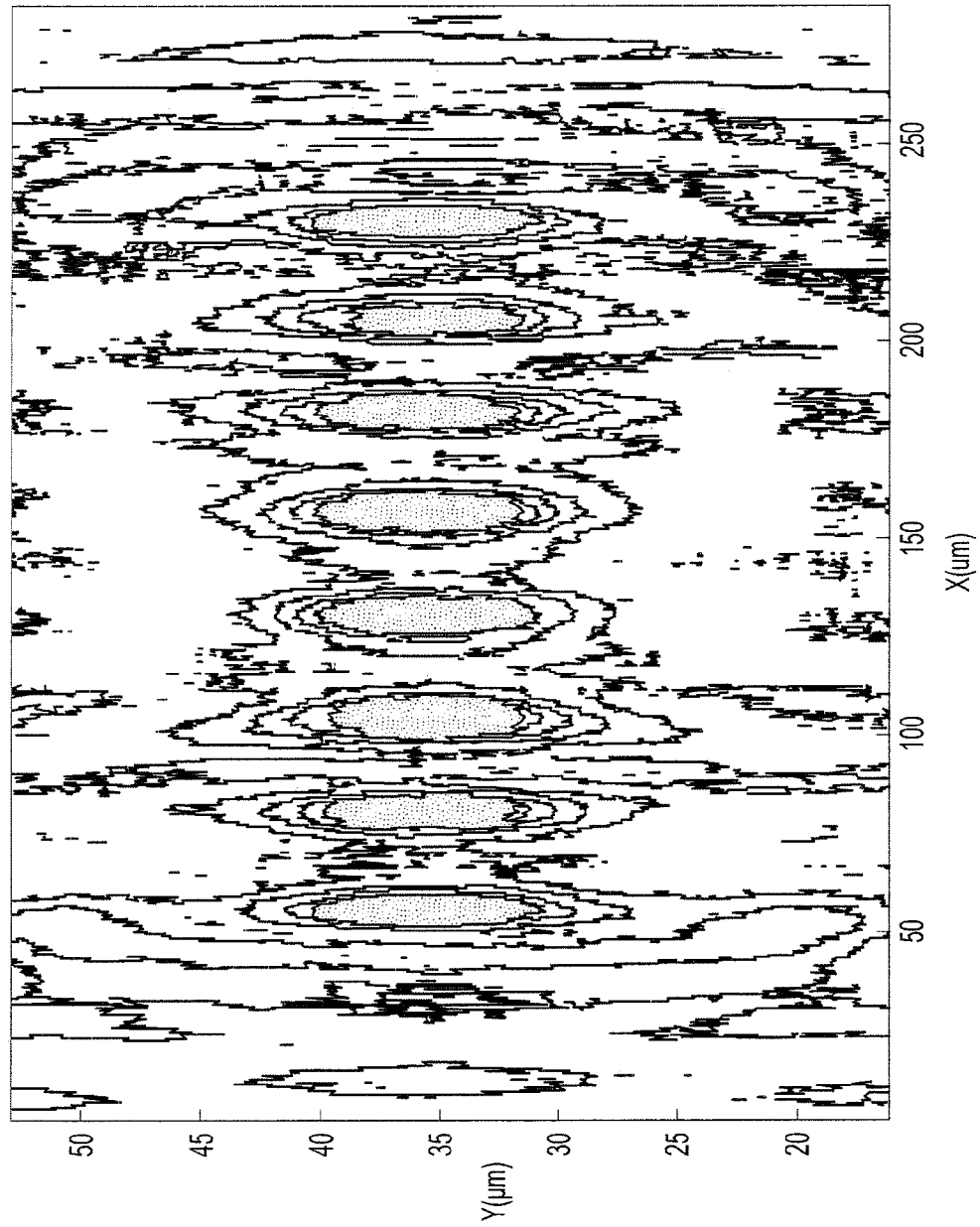

In this example, an automated process for aligning and attaching a fiber array to a star coupler is examined. The star coupler is shown in FIG. 11(a). An array of 8 fibers is coupled to the waveguide outputs of the star coupler. The spacing between the waveguides and the fibers in the fiber array are matched to increase system performance. To make the system more realistic, the star coupler input is excited with an optical pulse, with a tilt of 2 degrees, which is a tilt misalignment that can be reasonably expected to occur during use of current semi-automatic assembly processes. With the use of simulation the output wavefront that is expected from the star coupler can be determined. The 3D and 2D cross-section intensity contours, simulated in RSoft's BeamProp, are shown at the edge of the output of the star coupler. These results are also seen in FIGS. 11(b)-11(c).

Figure 12:
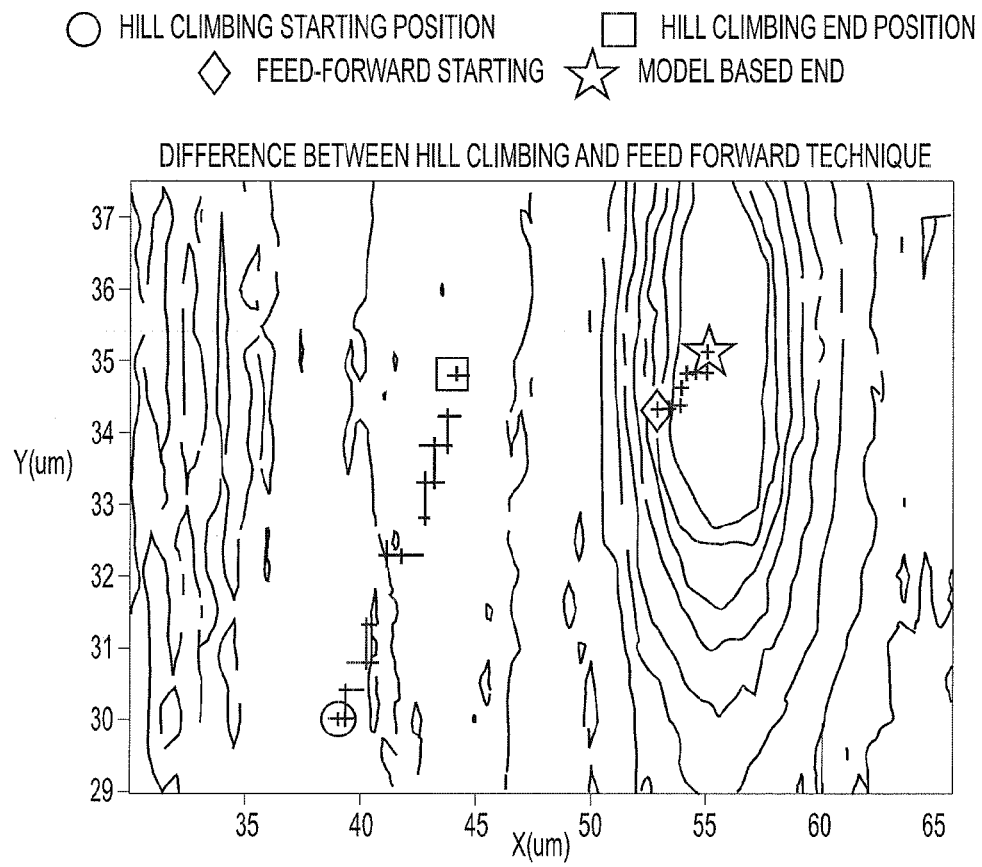
FIG. 12 shows a comparison of the knowledge based model control method of the present invention to a conventional alignment control method in both two-dimensional and three-dimensional graphs.
Figure 12:
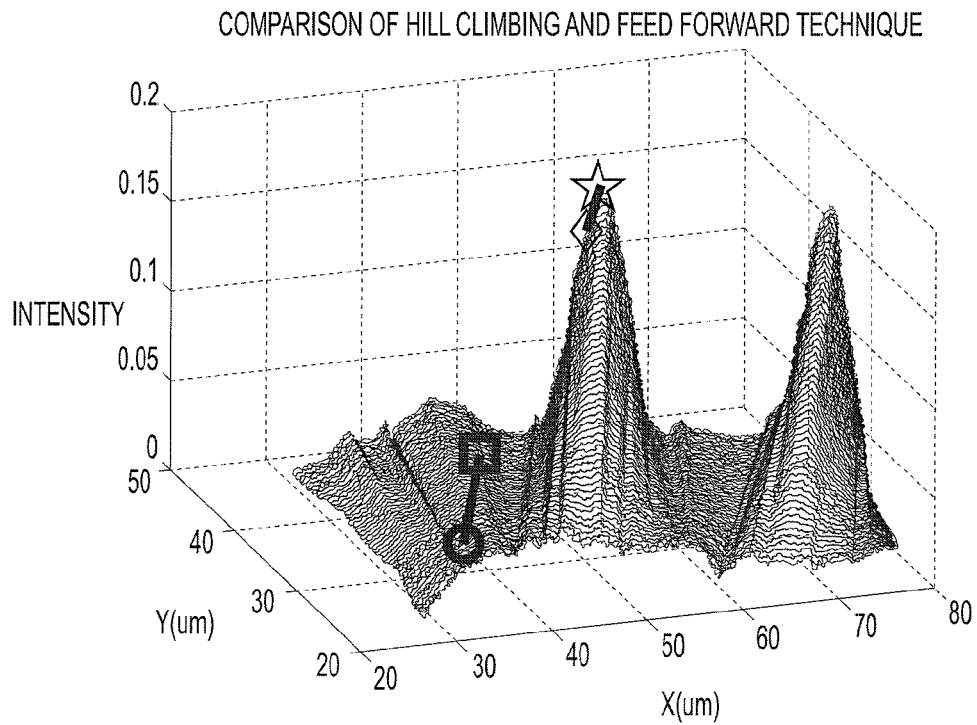

As in Example 1 above, the current industry standard is first performed for alignment and packaging automation for comparison with the knowledge based model. This is achieved by performing the gradient ascent, or "hill climbing", technique to find the peak power position of the first fiber, as previously described above. The first possible error using the hill climbing technique is that the positioning of the first fiber can occur at a local maximum. This is shown in FIG. 12, as both a two dimensional intensity contour and a three dimensional figure. The hill-climbing algorithm is started at a position, denoted by the circle in FIG. 12, which is roughly half the array pitch spacing, in both the x and y direction, and runs until a maximum is determined. However, as denoted by the line with the "+" symbol in FIG. 12, the hill-climbing technique "zigzags" and stops at a local maxima (denoted by the square) before the global peak power for the first fiber. The peak intensity at this local position is 0.0502 (AU).

In contrast, the knowledge based model discussed above is shown by the path marked with the "*" symbol in FIG. 12. From the device model simulation, the "feed-forward" control block determines where the maximum power peak will occur and sets this initial position in the control loop. In this example, the initial point is positioned roughly 5% away from the maximum value, to simulate the possibility of optical modeling errors, equipment misalignments, and/or errors due to manufacturing tolerances. The technique quickly finds the maximum power for coupling to the first fiber in the array, which is denoted by a star in FIG. 12. The peak optical intensity found at this peak is 0.2376 (AU), which is an increase of over 370% over the result of employing the current method as discussed above.

Figure 13:
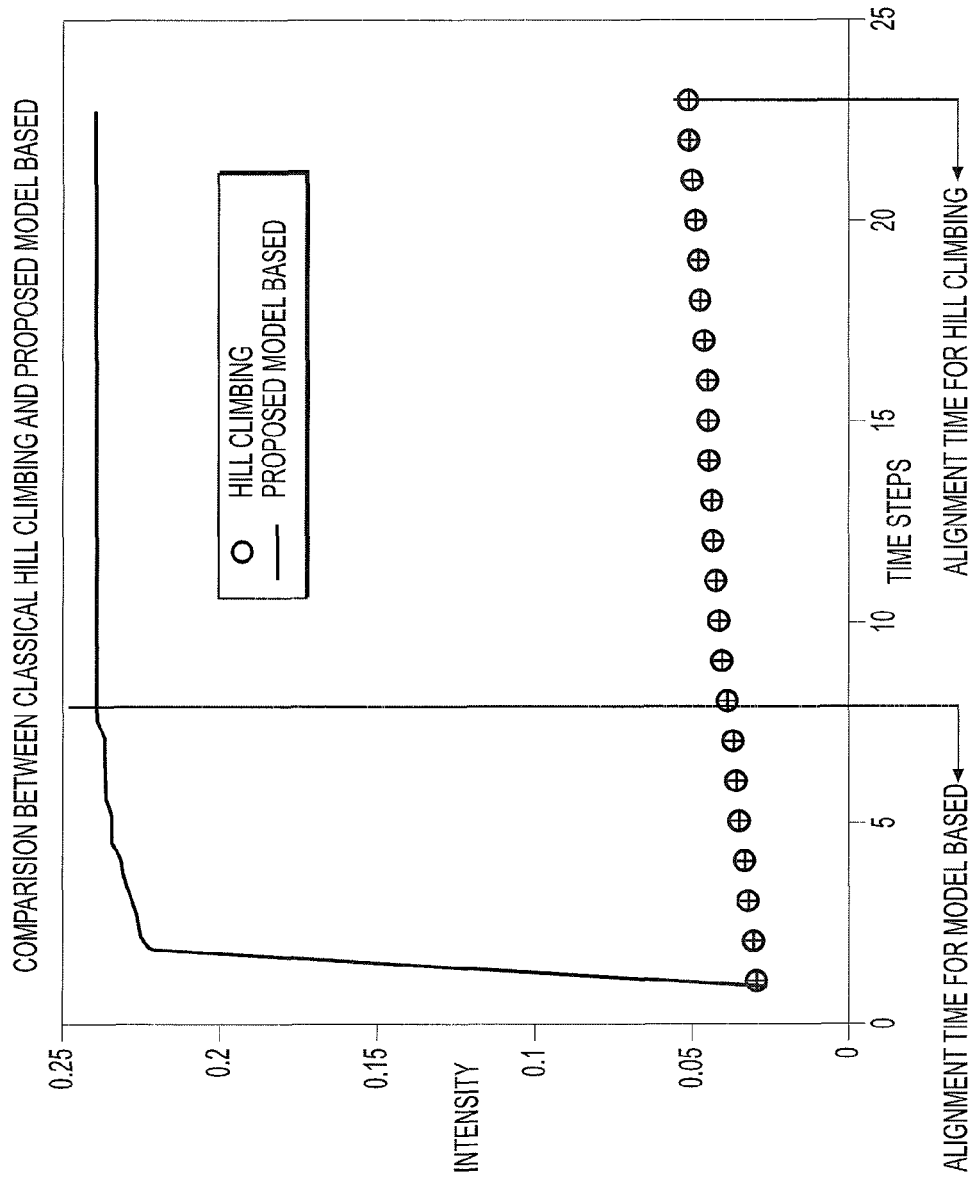
FIG. 13 shows an iterative time-step comparison of the knowledge based model control system of the present invention to the conventional alignment control method employed in FIG. 8.

Besides finding the global maximum power peak, the technique is more efficient when compared to the currently used alignment algorithm. Even in this simple example, the number of time-steps, or steps that the motors had to take to get to the maximum power position, is much less for the knowledge based model (~8 steps) than the standard hill-climbing technique (~23 steps), as seen in FIG. 13, which got caught in a local minimum and did not even reach the peak power position. The time-steps, in essence, reflect the speed of the automation process of the present invention.

Example 3

In Example 3, the algorithm for improving the performance of the entire system is described. The total power captured in the fiber array is examined. A common technique aligns a fiber array by determining the position for the maximum optical power in the first fiber, as showed in the example above. The remainder of the fiber array is then rotated around this position, until the maximum power is captured in the last fiber of the array. It is then assumed that the rest of the fiber array is aligned.

In this example, it is shown that in aligning a fiber array using this technique, the overall performance of the system is not considered. In contrast, the knowledge based model control loop of the present invention can take the performance of all of the fibers into consideration and thereby provide an increase in total system performance.

In this example, the total power of the fiber array is calculated by summing the optical intensity at each of the center fiber positions in the array. In the case of the hill-climbing technique, if the peak position of the first fiber is caught in a local maximum, as seen in FIG. 12, the total power of all 8 fibers is calculated to be 0.1959 (AU). If the hill-climbing algorithm is allowed the benefit of the doubt that the true optical peak for the first fiber can be found at the global maximum value, the total power calculated for the fiber array is 1.5296 (AU).

In contrast, with the knowledge based model approach, the entire optical field space can be examined by taking a plurality of measurements of optical power at different locations, and the position in which a certain alignment will achieve a maximum performance for the entire system can be determined. The total power is calculated for each case, and the optimal position of the fiber array is chosen at the point where the alignment gives the best performance for the entire system. In this case, it was found to be a maximum power of 2.0380 (AU), at a position offset from the first fiber center by about 3 µm in the x direction. Comparing the instant invention's technique verses the standard hill-climbing technique, an improvement of over 33% is shown when the hill-climbing uses the peak maximum of the first fiber, and over 940% when the hill climbing method gets caught in the local maximum.

Figure 14:
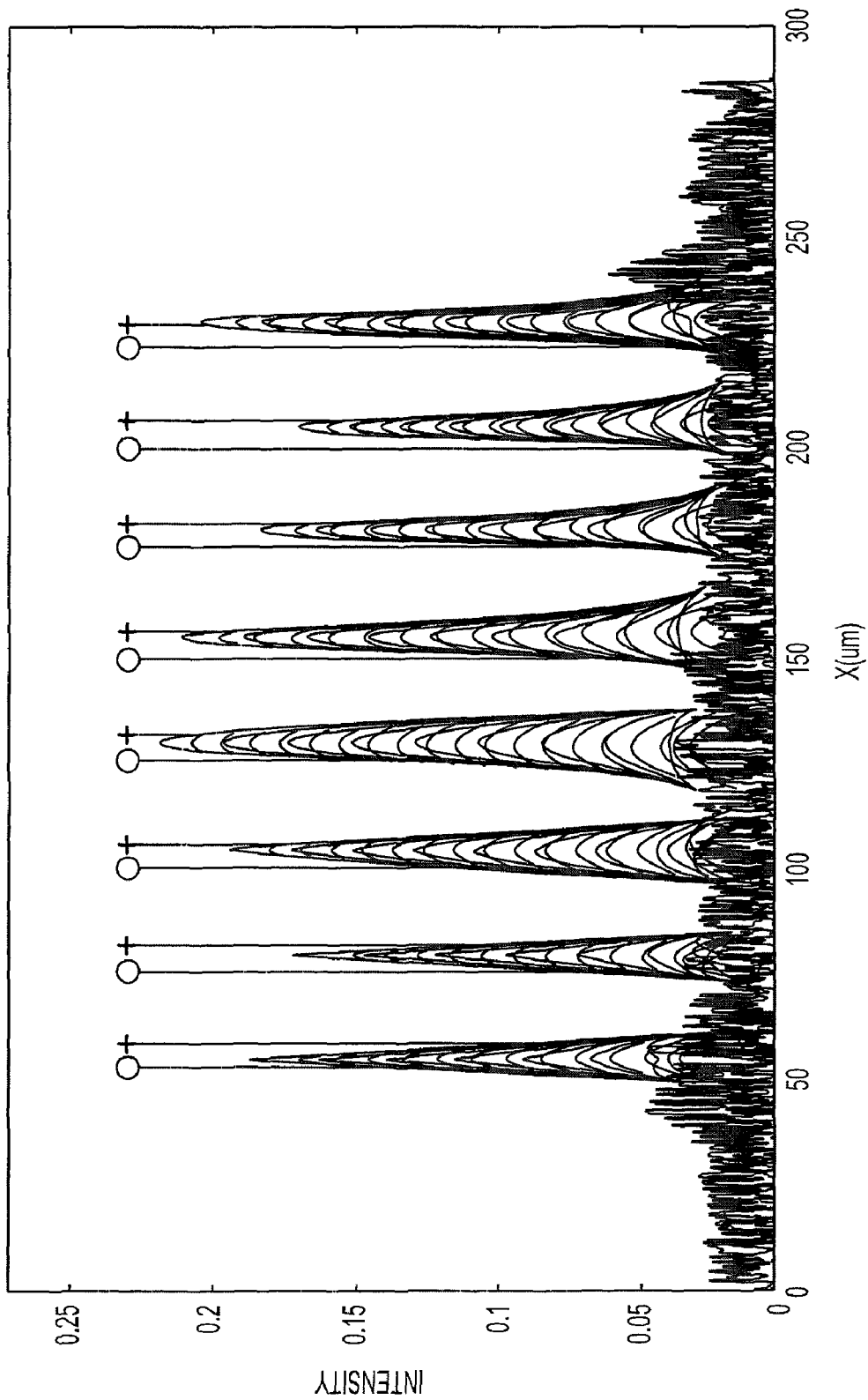
FIG. 14 shows fiber array alignment of the hill climbing algorithm and the knowledge based model control loop.

In FIG. 14, the positioning of each fiber in the array is shown using both the classical technique (centered at the peak power of the first fiber) and the knowledge based model technique. It can be seen that the knowledge based model control loop (denoted by the "+" shape) is closer to more array peaks than the hill-climbing technique (denoted by the "o" shape).

Example 4

Coupling of an Edge-Emitting Laser Diode to an Optical Fiber

This example highlights some of the advantages of the knowledge based model. In this example, coupling of an edge-emitting laser diode to an optical fiber is shown. This example illustrates one of the most commonly packaged devices using conventional optical automation processes.

Figure 15:
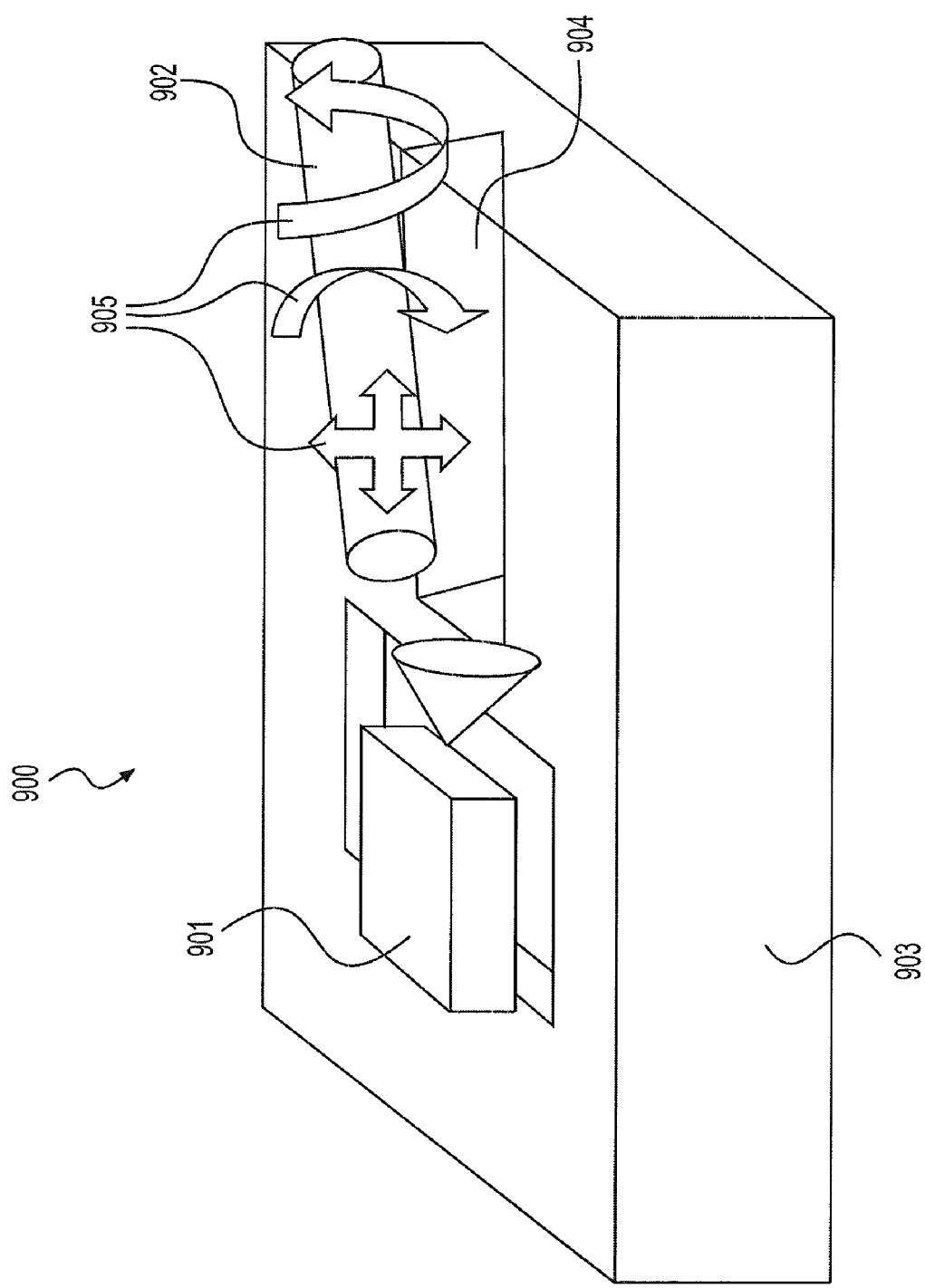
FIG. 15 shows a model of the edge emitting laser coupled to a fiber.

A model of device 900 used is seen in FIG. 15. In this example, a GaAs laser diode 901 is flip-chip bonded onto a silicon bench 903, containing the electrical drivers for the laser, along with a fabricated V-groove 904 for placement of fiber 902. The V-groove 904 provides "self-alignment" for the fiber 902, however, within the V-groove 904, the positioning of fiber 902 is critical to the final performance of device 900. The arrows 905 represent the 6 degrees of freedom (in both 2D and 3D) in which fiber 902 needs to be aligned.

Figure 16:
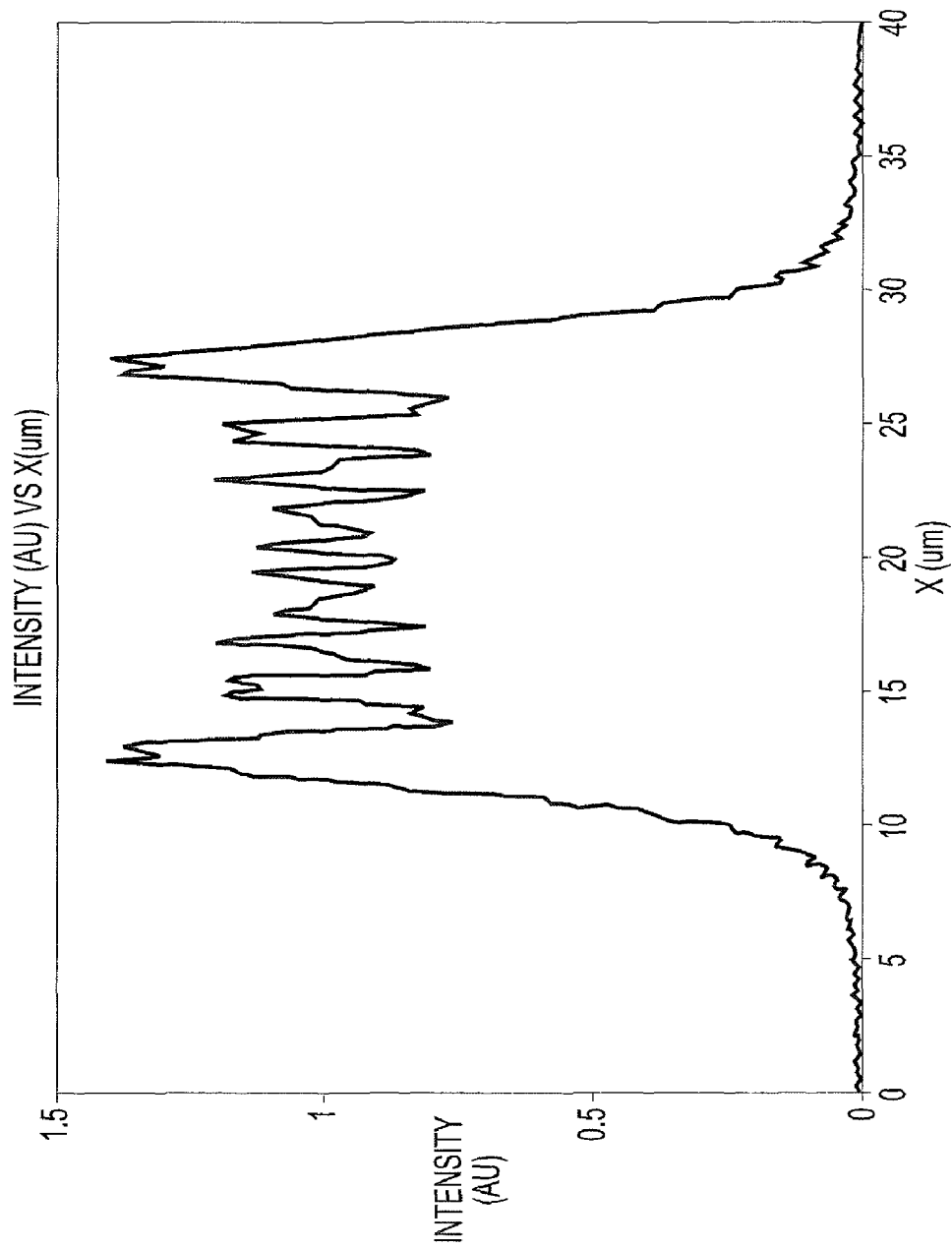
FIG. 16 shows a chart showing the power distribution simulation at the fiber interface.

In this example, the laser diode emits a broad Gaussian beam, which propagates through a 20×20 µm square aperture to a fiber with a 4 µm core. The aperture is used in this example, to ensure that the power distribution is not a simple uni-mode. The distance of propagation between laser-diode and fiber is only 10 µm, therefore the light has propagated only into the near-field and its 2D intensity pattern in an observation plane at the fiber shows diffractive effects, as seen in FIG. 16. This result is determined from the angular spectrum simulation.

In order to compare a conventional method and the method used in this example, the control loop is first analyzed with the conventional method. The conventional automation process determines an initial set point in the V-groove 904 through the visualization of the fiber 902 to the aperture, aligning the geometrical optical axis with the center of the fiber core (at a location of 20 µm in FIG. 16). From this set point, the gradient ascent algorithm is performed to find the position alignment for maximum power coupled into the fiber 902.

In contrast, the knowledge based model determines the positional alignment for the maximum power coupled into the fiber 902. Therefore, the knowledge based model starts by simulating the entire system to predict the best "feed-forward" set point. The simulation is performed using the angular spectrum technique, as the output intensity distribution and a distribution of the power coupled into the fiber 902 are determined. In this example, the feed-forward set point is defined with the simulated position of the maximum power (the area underneath the intensity curve) captured in the 4 µm fiber, seen in FIG. 17(*a*). The position is found at (13.8, 13.8 µm).

Figure 17A:
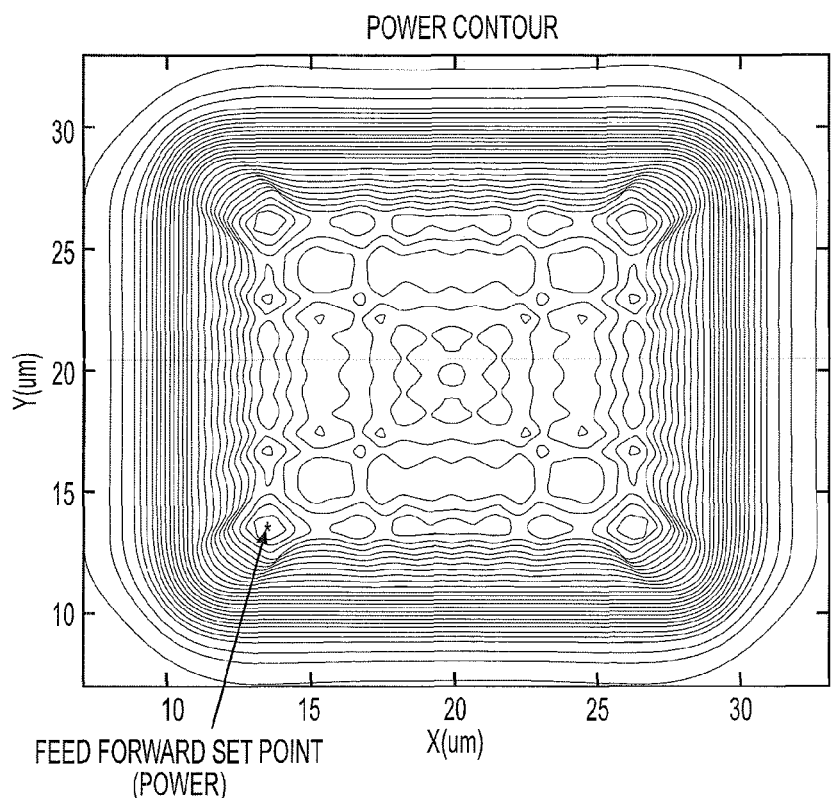
FIG. 17 (*a*) shows a diagram of the power contour.
Figure 17B:
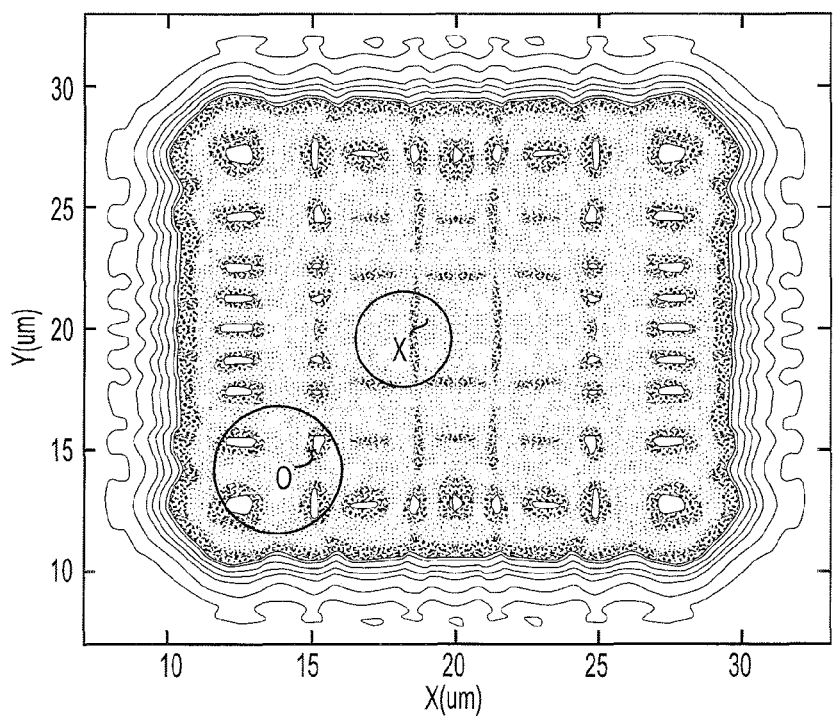

In FIG. 17(*b*), the fiber is coupled using the conventional technique and the knowledge based model is compared to the conventional technique. The conventional technique starts at a position close to the center of the geometrical optical axis (20,20 µm) and uses the gradient ascent algorithm, which stops the alignment loop at a local maximum power, denoted by the "X" in the figure. In contrast, the knowledge based model starts at the feed-forward position (13.8, 13.8 µm) and uses a gradient ascent algorithm to find the global maximum power coupled into the fiber, denoted by the "O" in the figure (actually, in this example, the algorithm starts off of the set point by a couple of microns to simulate possible mechanical and system misalignments). The paths of the gradient ascent algorithms for both the knowledge based model and the conventional method are included on the intensity diagram in FIG. 17(*b*). In this example, an increase of approximately 18% is achieved when using the knowledge based model, as compared to the conventional automation technique.

Figure 18:
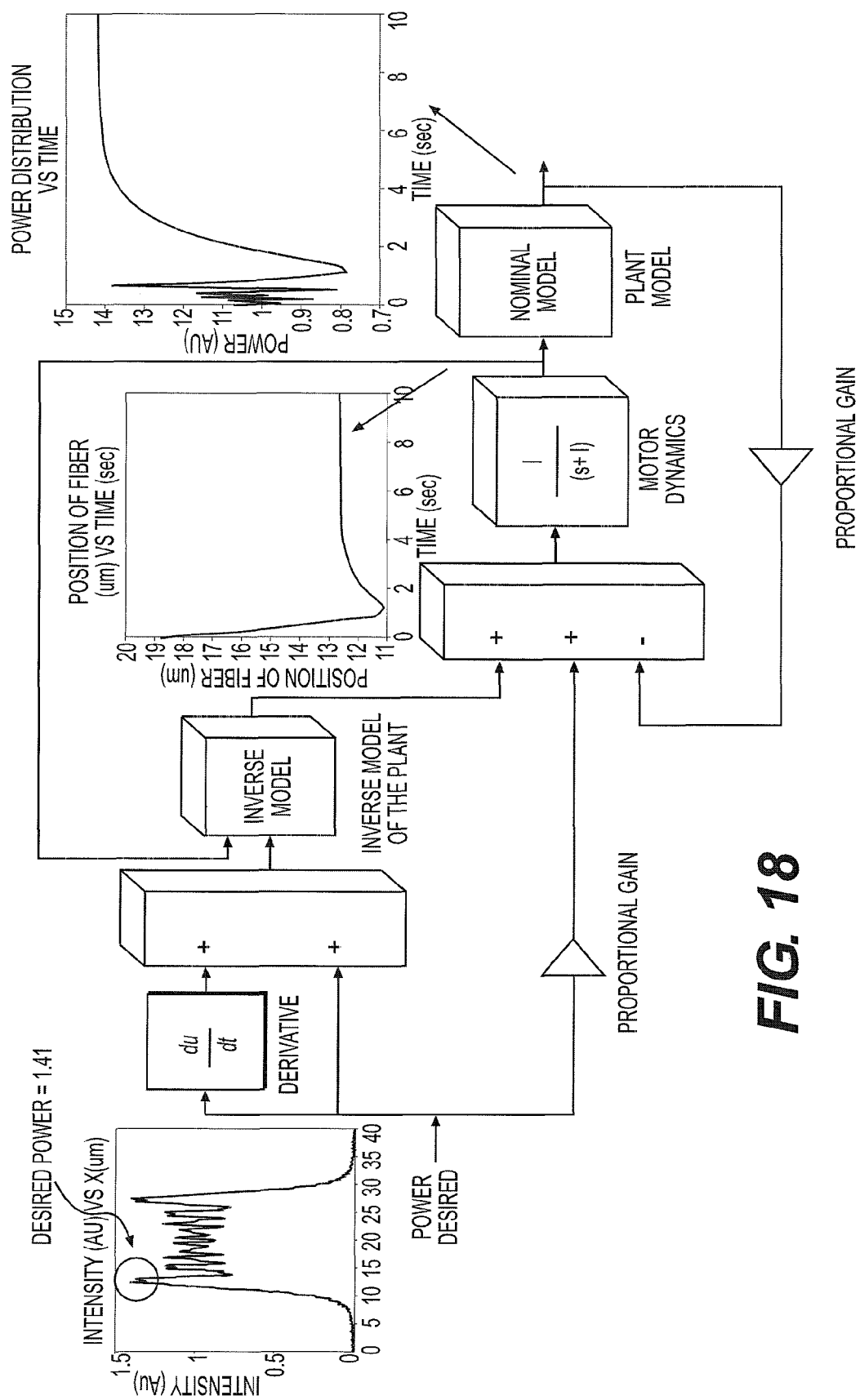
FIG. 18 shows a diagram of the control process including the feed-forward loop, and simulation results for the specific laser-to-fiber example.

Using the same laser diode-to-fiber coupling shown in FIG. 15, a complete simulation of the proposed automation control process is shown in FIG. 18. Again, an on-line simulation is performed at the point of attachment. For these on-line simulations, the maximum throughput power for the ideal positional alignment of the fiber 902 is determined. This is used as a target or tracking parameter. In this simulation, the angular spectrum optical modeling technique is used, and determines a peak intensity value of 1.41 (AU). The inverse model is calculated with the PWL deconstruction as presented in the previous section. Using a simple 1/(s+1) motor dynamic, the entire control loop is simulated in MATLAB's™ Simulink. Also included in FIG. 18, are simulation results, in terms of optical power received vs. time and motor position vs. time. Note for these control parameters, the position of the motor settles at a distance of 12.6 µm, which tracks the goal intensity value of 1.41, in approximately 7 seconds.

From the above examples, the effectiveness of the knowledge based model of the present invention can be seen. It is to be understood that even though numerous characteristics and advantages of the present invention have been set forth in the foregoing description, together with details of the method, the disclosure is illustrative only, and changes may be made within the principles of the invention to the full extent indicated by the broad general meaning of the terms in which the appended claims are expressed.

The invention claimed is:

1. A system for the automation of one or more of the design, assembly and packaging of optoelectronic devices comprising:
an automated manipulation device configured for the manipulation of an optoelectronic device component;
a knowledge based model derived using a formula and a set of one or more parameters for said optoelectronic device; wherein the formula is selected from one or more of a Rayleigh-Sommerfeld formulation, an angular spectrum solution to a Rayleigh-Sommerfeld formulation, a Ray formulation, a Gaussian formulation, a Fraunhofer Field Formulation, a Fresenel Field formulation, and vector solutions to Maxwell's equations;
a database for storing said knowledge based model;
a measuring device for taking a measurement of one or more parameters of the optoelectronic device component;
a controller for managing said automated manipulation device, said controller enabled to receive information from said database; wherein said controller comprises an initial set point device which utilizes said knowledge based model to determine an initial set point for said automated manipulation device, and a servo-feedback loop which utilizes said measurement of one or more parameters of the optoelectronic device component to determine a manipulation of the optoelectronic device component;
an initial set point derived from the knowledge based model and a learning loop which makes adjustments to said knowledge based model based on actual experience in one or more of the design, assembly, packaging, use and maintenance of said optoelectronic device.

2. The system according to claim 1, wherein said one or more parameters comprises one or more parameters selected from the group consisting of optical waveform characteristics and optical waveform features.

3. The system according to claim 2, wherein the knowledge based model employs one or more of optical power, optical intensity, optical phase and optical polarization.

4. The system according to claim 3, wherein the knowledge based model is derived using a formula selected from the group consisting of a Rayleigh Sommerfeld formulation and an angular spectrum solution to a Rayleigh Sommerfeld formulation.

5. The system according to claim 1, wherein said set of parameters comprises one or more parameters selected from the group consisting of optical waveform characteristics and optical waveform features.

6. The system according to claim 5, wherein the knowledge based model employs one or more of optical power, optical intensity, optical phase and optical polarization.

7. The system according to claim 6, wherein the knowledge based model is derived using a formula selected from the group consisting of a Rayleigh Sommerfeld formulation and an angular spectrum solution to a Rayleigh Sommerfeld formulation.

8. The system as claimed in claim 7, wherein at least one said measurement is employed by said learning loop in the adjustment of said knowledge based model.

9. An automated method for one or more of the assembly and packaging of optoelectronic devices comprising the steps of:
(a) providing an automated manipulation device configured for the manipulation of an optoelectronic device component;
(b) determining an initial set point for said automated manipulation device from a knowledge based model; wherein the knowledge based model is derived using one or more of a Rayleigh-Sommerfeld formulation, an angular spectrum solution to a Rayleigh-Sommerfeld formulation, a Ray formulation, a Gaussian formulation, a Fraunhofer Field Formulation, a Fresenel Field formulation, and vector solutions to Maxwell's equations;
(c) positioning said automated manipulation device at said set point;
(d) measuring at least one parameter of the optoelectronic device component;
(e) adjusting the position of said automated manipulation device based on said measurement; and
(f) repeating steps (d)-(e) until said optoelectronic device is assembled, packaged or assembled and packaged and
a learning loop which makes adjustments to said knowledge based model based on actual experience in one or more of the design, assembly, packaging, use and maintenance of said optoelectronic device.

10. The method according to claim 9, wherein said at least one parameter comprises one or more parameters selected from the group consisting of optical waveform characteristics and optical waveform features.

11. The method according to claim 10, wherein the knowledge based model employs one or more of optical power, optical intensity, optical phase and optical polarization.

12. The method according to claim 11, wherein the knowledge based model is derived using a formula selected from the group consisting of a Rayleigh Sommerfeld formulation and an angular spectrum solution to a Rayleigh Sommerfeld formulation.

13. The method according to claim 9, wherein said set of parameters comprises one or more parameters selected from the group consisting of optical waveform characteristics and optical waveform features.

14. The method according to claim 9, wherein the knowledge based model employs one or more of optical power, optical intensity, optical phase and optical polarization.

* * * * *